United States Patent
Fukuda et al.

(10) Patent No.: US 8,686,894 B2
(45) Date of Patent: Apr. 1, 2014

(54) RADAR IMAGING APPARATUS, IMAGING METHOD, AND PROGRAM THEREOF

(75) Inventors: Takeshi Fukuda, Osaka (JP); Kenichi Inoue, Osaka (JP); Toru Sato, Kyoto (JP); Takuya Sakamoto, Kyoto (JP); Kenshi Saho, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/478,323

(22) Filed: May 23, 2012

(65) Prior Publication Data

US 2012/0293359 A1 Nov. 22, 2012

Related U.S. Application Data

(63) Continuation of application No. PCT/JP2011/003657, filed on Jun. 27, 2011.

(30) Foreign Application Priority Data

Aug. 9, 2010 (JP) .................................. 2010-178959

(51) Int. Cl.
*G01S 13/42* (2006.01)
*G01S 13/64* (2006.01)

(52) U.S. Cl.
USPC ............ 342/107; 342/110; 342/146; 342/147

(58) Field of Classification Search
USPC .................. 342/107, 110, 127, 139, 146, 147
See application file for complete search history.

(56) References Cited

U.S. PATENT DOCUMENTS

| | | | |
|---|---|---|---|
| 4,717,916 A * | 1/1988 | Adams et al. ................. | 342/107 |
| 5,959,571 A | 9/1999 | Aoyagi et al. | |
| 6,717,545 B2 | 4/2004 | Dizaji et al. | |
| 6,822,606 B2 | 11/2004 | Ponsford et al. | |
| 6,867,731 B2 | 3/2005 | Dizaji et al. | |
| 7,642,952 B2 | 1/2010 | Fukuda | |

(Continued)

FOREIGN PATENT DOCUMENTS

| | | |
|---|---|---|
| CN | 1653354 | 8/2005 |
| CN | 101059563 | 10/2007 |

(Continued)

OTHER PUBLICATIONS

International Search Report issued Sep. 13, 2011 in International (PCT) Application No. PCT/JP2011/003657.

(Continued)

*Primary Examiner* — Matthew M Barker

(74) *Attorney, Agent, or Firm* — Wenderoth, Lind & Ponack, L.L.P.

(57) ABSTRACT

A radar imaging apparatus includes: (i) a delay code generation unit which repeats, for M scan periods, scan processing of generating, using a transmission code, N delay codes in a scan period for scanning N range gates having mutually different distances from the radar imaging apparatus; (ii) a signal storage unit which stores, in association with a range gate and a scan period, a baseband signal; (iii) a memory control unit which repeatedly writes, in the signal storage unit, for the M scan periods, N demodulated signals corresponding to a single scan period, and reads out a group of M demodulated signals corresponding to mutually different scan periods; (iv) a Doppler frequency discrimination unit which performs frequency analysis on demodulated signals having the same range gate; and (v) a direction of arrival calculation unit which estimates a direction of a target.

10 Claims, 14 Drawing Sheets

(56) References Cited

U.S. PATENT DOCUMENTS

| | | |
|---|---|---|
| 2003/0174088 A1 | 9/2003 | Dizaji et al. |
| 2003/0210179 A1 | 11/2003 | Dizaji et al. |
| 2004/0178951 A1 | 9/2004 | Ponsford et al. |
| 2009/0015464 A1 | 1/2009 | Fukuda |
| 2010/0207806 A1 | 8/2010 | Takahashi et al. |

FOREIGN PATENT DOCUMENTS

| | | |
|---|---|---|
| CN | 101581779 | 11/2009 |
| JP | 60-58570 | 4/1985 |
| JP | 2005-520159 | 7/2005 |
| JP | 2005-520160 | 7/2005 |
| JP | 2005-520161 | 7/2005 |
| JP | 2009-31165 | 2/2009 |
| WO | 97/40400 | 10/1997 |
| WO | 03/079037 | 9/2003 |
| WO | 03/079045 | 9/2003 |
| WO | 03/079046 | 9/2003 |
| WO | 2006/106774 | 10/2006 |
| WO | 2009/016459 | 2/2009 |

OTHER PUBLICATIONS

"*Two-dimensional human tracking using a three-element Doppler and direction-of-arrival (DD OA) radar*" Lin, A.; Ling, H., IEEE Radar Conference, Apr. 2006, pp. 248-251.

Office Action with Search Report issued Jan. 6, 2014 in corresponding Chinese patent application No. 201180005180.7, with partial English translation.

\* cited by examiner

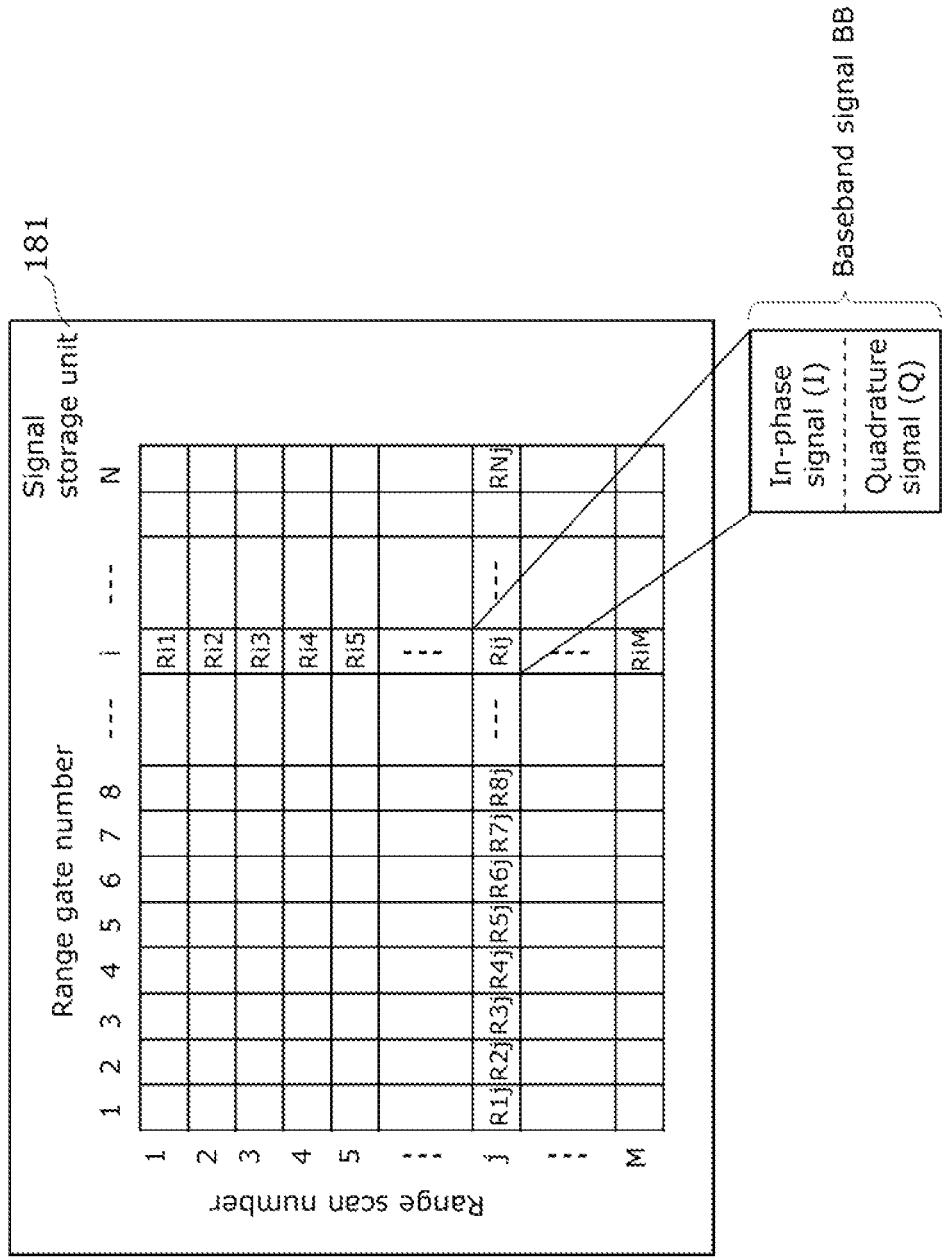

RADAR IMAGING APPARATUS, IMAGING METHOD, AND PROGRAM THEREOF

CROSS REFERENCE TO RELATED APPLICATIONS

This is a continuation application of PCT application No. PCT/JP2011/003657 filed on Jun. 27, 2011, designating the United States of America, which is based on claim priority of Japanese Patent Application No. 2010-178959 filed on Aug. 9, 2010. The entire disclosures of the above-identified application, including specification, drawings and claims are incorporated herein by reference in its entirety.

TECHNICAL FIELD

The present invention relates to a radar imaging apparatus and an imaging method of detecting a target object by radiating a transmission signal and by receiving reflected waves of the transmission signal reflected from the target object.

BACKGROUND ART

In recent years, there has been a growing demand for human body detection with the aim of offering security and safety in various social fields. In addition to counter-terrorism measures spreading worldwide, human detection is the most important problem for nursing care for the elderly and rescue operations after a disaster. Conventionally, there is a way to detect a human body by using an infrared device and a camera. However, there is a problem that a system using infrared ray has difficulty in distinguishing between human body temperature and an outside environment in a place where temperature is high. Moreover, there is a problem that a system using a camera faces an extreme fall in sensitivity in an environment where light cannot be sufficiently captured at night or during bad weather. In recent years, an imaging system using radar has drawn attention as a way to solve these problems.

However, there are many cases where imaging using radar requires many antennas or receivers in order to obtain sufficient data for estimating a shape. For example, a phased-array radar system obtains information about a shape of an object by transforming phases of many receivers (transmitters) and controlling and scanning directivity and a direction of radio waves. However, imaging using the radar leads to enlarging or complicating the system with a result that the system is expensive.

As a conventional way to solve the problems and detect an object and the object direction by a simple configuration, for example, there is a method using a technique known as Doppler and direction-of-arrival as disclosed in Non-Patent Literature 1.

FIG. 16 shows a configuration of a conventional radar apparatus.

A radar apparatus 901 shown in FIG. 16 includes a transmitter 910, receivers 920 and 930, a transmission antenna 911, and receiving antennas 912 and 913.

The radar apparatus 901 detects targets 931, 932, and 933. The radar apparatus 901 emits, from the transmitter 910, detection radio waves having a certain frequency and receives radio waves reflected from the targets 931, 932, and 933 via the receivers 920 and 930.

When the targets 931, 932, and 933 are moving at a certain radial velocity with respect to the radar apparatus 901, a frequency of reflected waves received by the receivers 920 and 930 shifts by a frequency corresponding to the radial velocity with respect to the frequency of the detection radio waves radiated from the transmission antenna 911. From the shifted frequency, a radial velocity for each of the targets 931, 932, and 933 can be detected.

Here, the radial velocity is a velocity component along a direction from the radar apparatus 901 to a target among velocities of the targets 931, 932, and 933. In this case, the radial velocity is a relative velocity component of each of the targets 931, 932, and 933 with respect to the radar apparatus 901. In other words, as shown in FIG. 16, assuming that the respective velocities of the targets 931, 932 and 933 are V1, V2, and Vi, the radial velocities for the targets 931, 932, and 933 are V1$f$, V2$f$, and Vi$f$, respectively, which are velocities divided along the respective directions from the radar apparatus 901 to the targets 931, 932, and 933.

In other words, the radar apparatus 901 detects the radial velocities V1$f$, V2$f$, and Vi$f$ of the targets 931, 932, and 933, respectively, from the frequency of reflected waves received by the receivers 920 and 930 with respect to the frequency of the detection radio waves.

Incidentally, the radar apparatus 901, as shown in FIG. 16, has two systems each of which includes a receiving antenna and a receiver corresponding to the receiving antenna. Furthermore, the receiving antennas 912 and 913 are provided at different places.

With this, a distance from each of the targets 931, 932, and 933 to the receiving antenna 912 is mutually different from a distance from each of the targets 931, 932, and 933 to the receiving antenna 913.

In this way, it is possible to detect directions of the targets 931, 932, and 933 thanks to the difference in a distance from the targets 931, 932, and 933 to two receiving antennas 912 and 913. Hereafter, a principle of detecting directions will be described in detail.

In FIG. 16, for example, because the target 933 is nearer to the receiving antenna 913 than the receiving antenna 912, reflected waves from the target 933 reach the receiving antenna 913 earlier than the receiving antenna 912. When the reflected waves received by the receiving antenna 912 are compared with the reflected waves received by the receiving antenna 913, the reflected waves received by the receiving antenna 912 are delayed in phase compared with the reflected waves received by the receiving antenna 913. Here, assuming that the target 933 is in a direction of θi from the front surface of the receiving antennas 912 and 913 and that the two receiving antennas are provided at a distance d, a phase difference between the reflected waves received by the receiving antenna 912 and the reflected waves received by the receiving antenna 913 can be represented by Expression 1. It is noted that a phase of the reflected waves received by the receiving antenna 912 is φ1, a phase of the reflected waves received by the receiving antenna 913 is φ2, and a wavelength of the detection radio waves emitted from the transmission antenna 911 is λ.

$$\phi2-\phi1 = 2\pi d \sin\theta/\lambda \quad \text{(Expression 1)}$$

When a transformation of Expression 1 results in Expression 2 as described below, it is possible to detect a direction θ of the target 933 from a phase difference φ2−φ1 in reflected waves received by the two receiving antennas 912 and 913.

$$\theta = \sin^{-1}\{(\phi2-\phi1)\lambda/(2\pi d)\} \quad \text{(Expression 2)}$$

This is a technique called direction-of-arrival (DOA).

As described above, the conventional radar apparatus 901 shown in FIG. 16 makes it possible, by detecting both a phase and a Doppler frequency, to identify a plurality of targets and detect a direction and a velocity for each of the targets. It is noted that in FIG. 16, the radar apparatus 901 cannot detect only a one-dimensional direction because the radar apparatus 901 has the two receiving antennas 912 and 913, but for example, can detect a horizontal-and-vertical two-dimensional direction by disposing one more receiving antenna other than on a straight line including the receiving antennas 912 and 913.

The radar apparatus 901, for example with respect to human detection, can detect a human body by using a different motion for each of the human body parts. Specifically, because the head, hands, and legs move at different velocities with respect to the trunk of the body, it is possible to detect a human body from the directions and the velocities.

Incidentally, as a conventional technique of detecting an object and the direction, Patent Literature 1 discloses a technique of detecting a direction of an object from a beam pattern property for each of the antennas and a delay time of a spreading code.

CITATION LIST

Patent Literature

Patent Literature 1: International Publication No. WO97/40400

Non Patent Literature

Non-Patent Literature 1: "Two-dimensional human tracking using a three-element Doppler and direction-of-arrival (DDOA) radar" Lin, A.; Ling, H., IEEE Radar Conference, April 2006, pp. 248-251

SUMMARY OF INVENTION

Technical Problem

However, a configuration of conventional Non-Patent Literature 1 has a problem that DOA is unstable when a Doppler frequency is near. This is because the radar apparatus identifies each of the objects by a Doppler frequency, making it impossible to identify, as another object, an object moving at the same radial velocity with respect to the radar apparatus. Accordingly, it is also impossible to identify a direction of arrival. In other words, it is required that all objects within an irradiation region of detection radio waves have a mutually different Doppler frequency, that is, are moving at a different radial velocity.

In a real world, however, it is normal that many objects are moving differently and it is highly likely that there may be, somewhere, an object happening to move at a velocity close to a radial velocity of a target to be detected. These are all detrimental to target detection.

Moreover, in the case where there is, nearby, a communication system having the same frequency band as that of detection radio waves, or there is another radar system nearby, the conventional radar apparatus is influenced by such systems and cannot detect a target. In this way, the conventional radar apparatus has a configuration which is vulnerable to intervention by another system.

Therefore, a configuration can be considered which detects a target for each range gate that is a distance region each having a mutually different distance from the radar apparatus.

However, because resolution of a Doppler frequency is determined by an inverse of an analysis time, when a target is detected for each range gate, a long time is necessary for an analysis on the Doppler frequency. With this, there is a problem that a processing time is longer. In this way, the longer processing time makes it sometimes impossible to detect a direction of a moving target.

Moreover, even if the configuration of Patent Literature 1 is applied to a configuration which detects a Doppler frequency, a long time is similarly necessary for an analysis on a Doppler frequency and therefore a processing time is longer. In other words, it is sometimes impossible to detect a direction of a moving target.

The present invention has an object to solve the aforementioned problems and provide, by decreasing a processing time, a radar imaging apparatus and an imaging method of enhancing a function of detecting a direction of a moving object.

Solution to Problem

A radar imaging apparatus according to an aspect of the present invention includes: a transmission unit configured to generate a transmission signal by spreading carrier waves using a transmission spreading code; a transmission antenna which radiates the transmission signal as radiation waves; a plurality of receiving antennas each of which receives reflected waves which are the radiation waves reflected from an object; a delay code generation unit configured to repeat, for M scan periods, scan processing of sequentially generating N delay codes in a scan period for scanning N range gates having mutually different distances from the radar imaging apparatus, the N delay codes being the same as the transmission spreading code and corresponding to the distances, M being an integer equal to or greater than two, and N being an integer equal to or greater than two; a plurality of despreading units corresponding to the respective receiving antennas and each configured to despread, by sequentially using the N delay codes, the reflected waves received by a corresponding one of the receiving antennas; a plurality of demodulators corresponding to the respective despreading units and each configured to perform, using the carrier waves, quadrature demodulation of the reflected waves despread by a corresponding one of the despreading units, and generate demodulated signals Rij corresponding to the reflected waves received by a corresponding one of the receiving antennas, i being an integer from one to N, and j being an integer from one to M; a storage unit configured to store, in association with a delay time in the delay code generation unit and a scan period, the demodulated signals Rij generated by each of the demodulators; a memory control unit configured to (i) repeatedly write, in the storage unit, for the M scan periods, the N demodulated signals $R1j$ to RNj corresponding to the mutually different distances corresponding to the N delay codes in the delay code generation unit and a single scan period, and (ii) sequentially read out, from the storage unit, a group of the M demodulated signals Ri1 to RiM corresponding to same distances and mutually different scan periods; a Doppler frequency detection unit configured to detect, for each of the demodulators, a Doppler frequency component, a phase, and an intensity by performing frequency analysis on the M demodulated signals Ri1 to RiM read out by the memory control unit and corresponding to the same distances, the Doppler frequency component being a frequency component representing a difference between the reflected waves and the carrier waves in each of the range gates, and the phase and the intensity corresponding to the Doppler frequency component; and a direction estimation unit configured to estimate a direction of the object by (i) calculating, from the detected phase corresponding to each of the demodulators, a phase difference between the demodulators and (ii) detecting, from the calculated phase difference, a direction of arrival of the reflected waves in each of the range gates.

With this, the demodulated signals Rij which are a result of a plurality of delay time sweeps are stored in the storage unit. Moreover, the radar imaging apparatus performs Doppler frequency discrimination processing for demodulated signals Ri1 to RiM having the same distances from the radar imaging apparatus. This configuration makes it possible to perform Doppler frequency discrimination processing for the demodulated signals Rij without depending on the storage unit, and compared with a simple configuration which changes a delay time setting every time processing is completed, the radar imaging apparatus can reduce a time necessary to sweep a distance region while obtaining resolution of intended Doppler frequency discrimination processing. Accordingly, the radar imaging apparatus can enhance a function of estimating a direction of a moving object.

Moreover, the radar imaging apparatus can process the demodulated signals Rij corresponding to reflected waves for each detection range in which a distance from the radar imaging apparatus is defined as a detection region equal to or greater than a k-th time and equal to or less than (k+1)th time a distance determined by a chip rate of a spreading code (k is an integer equal to or greater than zero). Accordingly, the radar imaging apparatus can identify, even in a case where there is a moving object having the same radial velocity outside the range gate, a frequency of reflected waves from the detection region without an influence of reflected waves from the object. In other words, the radar imaging apparatus can detect, even in a case where there is a moving object having the same radial velocity outside the detection region when there is an object in the detection region, a Doppler frequency which is frequency of a difference between reflected waves and carrier waves from an object in the detection region. Moreover, the radar imaging apparatus, as a transmission signal, uses a code modulated signal, and therefore making it possible to identify a self-emitted signal with a code even though there is an influence of radio waves radiated from another radar system and the like. In other words, the radar imaging apparatus can decrease an influence of the other radar system. As a result, there is a significant decrease in a possibility that DOA is indefinite due to an influence from an object whose frequency is near a Doppler frequency or interference by another system, with a result that the radar imaging apparatus can detect a direction of an object with a simple configuration and in a short time.

Moreover, the direction estimation unit is configured to estimate that a direction of arrival of the reflected waves including a Doppler frequency component is the direction of the object, the Doppler frequency component having an intensity equal to or greater than a predetermined first threshold value, and the intensity being detected by the Doppler frequency detection unit.

With this, the radar imaging apparatus can estimate a direction of an object. Specifically, the radar imaging apparatus can recognize, regarding a Doppler frequency having an intensity equal to or greater than a first threshold value, a direction of an object by using a phase difference between receiving antennas and a physical distance between the receiving antennas.

Moreover, the Doppler frequency detection unit further includes a distance estimation unit configured to estimate that the distance of one of the range gates in which the Doppler frequency component is detected is a distance from the radar imaging apparatus to the object, the Doppler frequency component having an intensity equal to or greater than the first threshold value, and the intensity being detected by the Doppler frequency detection unit.

With this, the radar imaging apparatus can perform detailed information processing because information about a distance from the radar imaging apparatus to an object can be obtained. Specifically, a signal received by the receiving antenna is despread with a delay code generated by the delay code generation unit and having a predetermined delay time with respect to a transmission spreading code. Accordingly, only in the case where a round-trip delay time in which a signal is radiated from the transmission antenna, is reflected by an object, and then is propagated to the receiving antennas, and delay time of a delay code are the same, carrier waves having a Doppler frequency shift corresponding to a radial velocity of an object are reproduced. With this, by the Doppler frequency detection unit, a Doppler frequency corresponding to the radial movement velocity is outputted. However, because in the case where a round-trip delay time and a delay time of a delay code are not the same, a frequency spectrum is in a state of spread in a wide band depending on a chip rate of a transmission spreading code, this influence little contributes to a result of detection by the Doppler frequency detection unit. Accordingly, in the case where any of the Doppler frequencies of the Doppler frequency detection unit has an intensity equal to or greater than the first threshold value in a certain delay time, it can be determined that there is an object at a distance which electromagnetic wave propagates in half of the delay time.

Moreover, the direction estimation unit is further configured to estimate, from the Doppler frequency component, a radial velocity which is a velocity of the object as viewed from the radar imaging apparatus, the Doppler frequency component having the intensity equal to or greater than the first threshold value, and the intensity being detected by the Doppler frequency detection unit.

With this, the radar imaging apparatus can estimate a radial velocity of an object, making it possible to make a high level of determination such as prediction of an approach of an object.

Moreover, each of the N delay codes has a delay time which is mutually different with respect to the transmission spreading code, and the delay time is an integer multiple of a bit time which is a time for providing one bit of the transmission spreading code.

With this, as long as reflected waves which an object is reflecting has an identifiable intensity in the Doppler frequency detection unit, a configuration in which a configuration of the delay code generation unit is simplified and all objects within a specific distance region can be detected can be realized.

Moreover, the delay time is any one of a K-th (K is an integer) time the bit time to a (K+N−1)th time the bit time, and the scan processing generates the N delay codes, by incrementing, by the bit time, the delay time from K-th time the bit time to (K+N−1)th the bit time or by decrementing, by the bit time, the delay time from (K+N−1)th the bit time to K-th time the bit time.

With this, the configuration of the delay code generation unit can be further simplified and making it possible to decrease interference among a plurality of range gates.

Moreover, the distance estimation unit is configured to: identify a peak intensity from an intensity distribution of the Doppler frequency component corresponding to the delay time for each Doppler frequency component, the peak intensity being a local maximum intensity, and the Doppler frequency component being detected by the Doppler frequency detection unit; and estimate a distance from the radar imaging apparatus to the object by performing interpolation processing with use of the identified peak intensity, a pre-peak intensity, and a post-peak intensity, the distance being estimated with, as a resolution, a distance shorter than a distance corresponding to the bit time, the pre-peak intensity being an intensity corresponding to a delay time shorter by the bit time than the delay time corresponding to the identified peak intensity, and the post-peak intensity being an intensity corresponding to a delay time longer by the bit time than the delay time corresponding to the identified peak intensity.

With this, the radar imaging apparatus can detect, regarding an extracted object, the distance in a resolution smaller than a length of the range gate with a high degree of accuracy.

Moreover, a chip rate CR of the transmission spreading code and the delay code satisfies: $CR \leq 2 \times f0 \times vres/vmax$ where a frequency of the carrier waves is f0, an expected maximum value of a radial velocity which is a velocity of the object as viewed from the radar imaging apparatus is vmax, and a resolution at which the radial velocity can be detect is vres.

With this, the radar imaging apparatus can decrease an error in the case of detecting a distance to an object in a resolution smaller than a length of the range gate.

Moreover, the radar imaging apparatus further includes a control unit configured to control (i) a first operation mode in which the delay code generation unit repeats the scan processing M times and (ii) a second operation mode in which the delay code generation unit repeatedly generates the same delay code, wherein the control unit is configured to determine, in the first operation mode, whether or not there is a Doppler frequency component having an intensity equal to or greater than a predetermined second threshold value, and switch to the second operation mode when it is determined that there is the Doppler frequency component having the intensity equal to or greater than the predetermined second threshold value, the intensity being detected by the Doppler frequency detection unit, and the delay code generation unit is configured to repeatedly generate, in the second operation mode, the delay code corresponding to a range gate in which the Doppler frequency component equal to or greater than the predetermined second threshold value is detected, the storage unit is configured to avoid storing a demodulated signal which is despread using the delay code corresponding to the range gate, and demodulated, and the Doppler frequency detection unit is configured to detect again, by (i) sampling, in a cycle shorter than the scan period, the demodulated signal avoided being stored by the storage unit and (ii) performing frequency analysis on the sampled demodulated signal, a phase and an intensity of the Doppler frequency component in a range gate in which the Doppler frequency component equal to or greater than the predetermined second threshold value is detected.

With this, the radar imaging apparatus can enhance direction accuracy and distance accuracy of an observed object.

More, in the second operation mode, favorably, an observation time of the demodulated signal necessary for the Doppler frequency detection unit to perform the frequency analysis is equal to a time necessary to repeat the scan period M times.

With this, the radar imaging apparatus can decrease degradation in a velocity resolution because a velocity resolution in determining the existence of an object in all range gates can be equal to a velocity resolution in detecting a direction and a distance with a high degree of accuracy of an object in a range gate in which a Doppler frequency component having equal to or greater than the predetermined second threshold value is detected.

Moreover, it is preferable that the predetermined second threshold value is a value in which the number of the gange gates is N−2 or less, each of the range gates being determined to have the intensity equal to or greater than the predetermined second threshold value.

With this, compared with a simple configuration in which discrimination processing is performed for a Doppler frequency without the storage unit and a delay time setting is changed every time processing is completed, an overall processing time necessary for the radar imaging apparatus can be decreased because a time necessary to analyze a Doppler frequency for all range gates via the storage unit is equal to a time necessary to analyze a Doppler frequency for any of the range gates without the storage unit.

It is noted that the present invention can be realized as a radar imaging apparatus including characteristics processing units but also as an imaging method, as steps, included in the apparatus.

It is noted that the present invention can be realized as a program for causing a signal processing processor of the radar imaging apparatus to execute the steps included in the imaging method. Furthermore, it is possible to be realized as a computer-readable recording medium such as a Compact Disc Read Only Memory (CD-ROM) on which the program is recorded, or information indicating the program, data or a signal. Moreover, such program, information, data, and signal may be distributed via a communication network such as the Internet.

Advantageous Effects of Invention

The present invention can provide a radar imaging apparatus which can enhance a function of detecting a direction of a moving target.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 5 shows a diagram showing a configuration of a signal storage unit of the radar apparatus according to Embodiment 1 of the present invention;

DESCRIPTION OF EMBODIMENTS

Embodiment 1

Hereafter, embodiments of the present invention will be described with reference to drawings.

Figure 1:
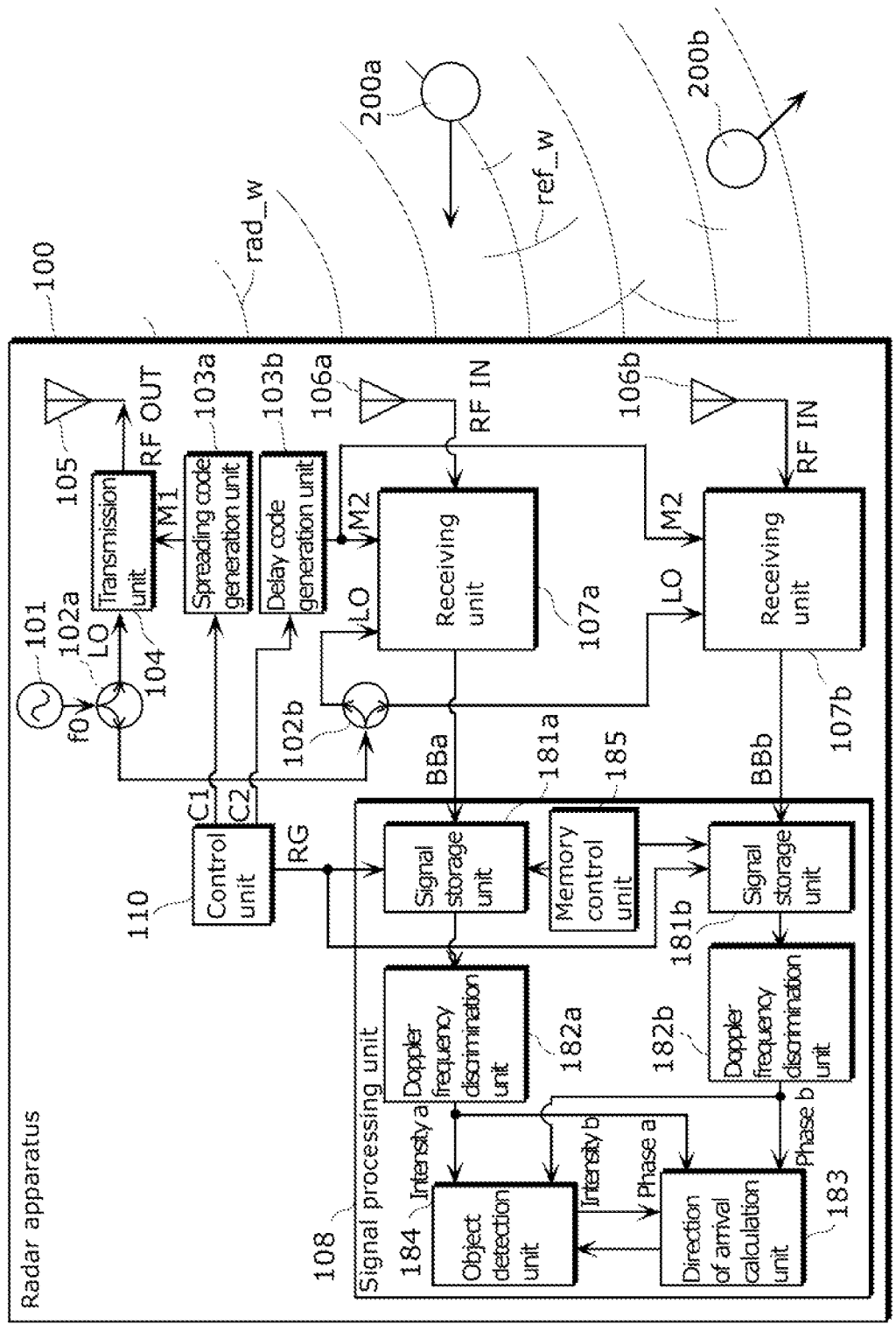
FIG. 1 is a block diagram showing a configuration of a radar apparatus according to Embodiment 1 of the present invention.

FIG. 1 is a block diagram showing a configuration of a radar apparatus 100 according to Embodiment 1. It is noted that in FIG. 1, targets (objects) 200a and 200b to be detected by the radar apparatus 100 are also illustrated.

The radar apparatus 100 is a radar imaging apparatus according to the present invention, including a function of detecting radial velocities and directions of the targets 200a and 200b and a function of measuring, using a spreading code, a distance to each of the targets 200a and 200b.

Specifically, the radar apparatus 100 includes an oscillator 101, distributors 102a and 102b, a spreading code generation unit 103a, a delay code generation unit 103b, a transmission unit 104, a transmission antenna 105, receiving antennas 106a and 106b, receiving units 107a and 107b, a signal processing unit 108, analog-to-digital converters 109a, 109b, 109c, and 109d, and a control unit 110. It is noted that as long as it is not especially necessary to distinguish between the target 200a and the target 200b, they will be indicated as the target 200. Moreover, the radar apparatus 100 is determined to be stationary. Hereafter, each of the configurations will be described in detail.

(Oscillator 101)

The oscillator 101 generates a local oscillating signal LO having a frequency f0 (also called carrier waves). As a frequency f0 of the carrier waves LO, for example, a frequency band of 60 GHz is used. It is noted that the oscillator 101 may have a configuration which directly generates a frequency f0 of the carrier waves LO or a configuration which generates the carrier waves LO of an intended frequency f0 by multiplying a signal generated outside.

(Distributors 102a and 102b)

The distributors 102a and 102b, by distributing an input signal, output two signals having the same frequency as a frequency of the input signal. Specifically, the distributor 102a, by distributing the carrier waves LO generated by the oscillator 101, generates two signals having a frequency f0 which is the same as a frequency of the carrier waves LO, and outputs one of the two signals to the transmission unit 104 and the other signal to the distributor 102b. Meanwhile, the distributor 102b, by distributing the signal inputted from the distributor 102a, generates two signals having the same frequency as a frequency of the inputted signal, that is, two signals having the same frequency f0 as a frequency of the carrier waves LO, and then outputs one of the signals to the receiving unit 107a and the other signal to the receiving unit 107b. In other words, the distributors 102a and 102b output the carrier waves LO having the frequency f0 generated by the oscillator 101 to the transmission unit 104, the receiving unit 107a, and the receiving unit 107b.

(Spreading Code Generation Unit 103a and Delay Code Generation Unit 103b)

The spreading code generation unit 103a generates a spreading code to be used for spread spectrum. The spreading code (hereafter referred to as M1) is, for example, a spreading code of an M-sequence code having a bit rate of 250 Mbps. It is noted that the spreading code M1 generated by the spreading code generation unit 103a corresponds to a transmission spreading code according to the present invention.

Specifically, the spreading code generation unit 103a is, for example, a digital circuit, and, for example, sequentially extracts a spreading code stored in a storage device (not illustrated) installed outside the spreading code generation unit 103a, or sequentially generates a spreading code based on a rule that is stored inside or outside the spreading code generation unit 103a (for example, a formula). The spreading code generation unit 103a outputs the generated spreading code to the transmission unit 104.

The delay code generation unit 103b generates a delay code (hereafter referred to as M2) having a delay time with respect to the spreading code M1. Specifically, the delay code generation unit 103b, in a scan period for scanning N (N is an integer equal to or greater than two) range gates having mutually different distances from the radar apparatus 100, repeats, for the M (M is an integer equal to or greater than 2) scan periods, a range scan operation (also called scan processing) of sequentially generating N delay codes M2 that are the same as the transmission code M1 and are corresponding to the distances of N range gates from the radar apparatus 100. More specifically, the delay code generation unit 103b generates a delay as code M2 that is a code which is delayed with respect to the spreading code M1 by a delay time C2 instructed by the control unit 110. Moreover, the control unit 110 provides an instruction of the delay time C1 to the spreading code generation unit 103a. The delay time C1 is zero, for example.

Here, the delay time C2 is a delay time of a time waveform of a delay code M2 with respect to a time waveform of a spreading code M1, and in the case where the delay time C2 is zero, the time waveform of the delay code M1 and the time waveform of the delay code M2 are the same, but in the case where the delay time C2 is not zero, the time waveform of the delay code M2 is a waveform in which the time waveform of the spreading code M1 is delayed by the delay time C2.

Specifically, the delay code generation unit 103b is, for example, a digital circuit. The delay code generation unit 103b, following an instruction by the control unit 110, generates the delay code M2 by sequentially extracting, in a state of being delayed with respect to the spreading code M1, a code stored in the storage device installed outside the spreading code generation unit 103a and referred by the spreading code generation unit 103a. Alternately, the delay code generation unit 103b sequentially generates, based on the same formula as a formula used for generating the spreading code M1, the delay code M2 by generating the same code as the spreading code M1 in a state of being delayed with respect to the spreading code M1.

(Transmission Unit 104)

Figure 2:
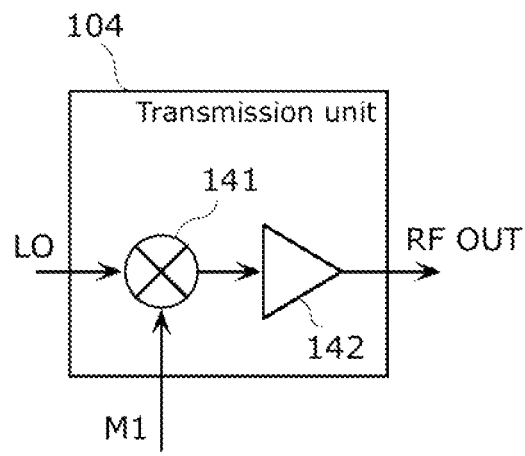
FIG. 2 is a block diagram showing a detailed configuration of a transmission unit of the radar apparatus according to Embodiment 1 of the present invention.

The transmission unit 104 generates a transmission signal (hereafter referred to as RF OUT) by spreading a local oscillating signal LO (carrier waves) by using the spreading code M1 generated by the spreading code generation unit 103a. For example, the transmission unit 104 is implemented as a configuration as shown in FIG. 2, and includes a spreading mixer 141 which multiplies the carrier waves LO by the spreading code M1, and an amplifier 142 which generates a transmission signal RF OUT by amplifying the carrier waves LO spread by the spreading mixer 141. In order to set radio waves radiated from the radar apparatus 100 at an appropriate level set by legal regulation, the amplifier 142 amplifies, for example, the carrier waves LO spread by the spreading mixer 141 to an appropriate level.

(Transmission Antenna 105)

In FIG. 1, the transmission antenna 105 radiates, as radiation waves (hereafter referred to as rad_w), the transmission signal RF OUT generated by the transmission unit 104.

The radiation waves rad_w radiated from the transmission antenna 105 are reflected by the target 200, and are received as reflected waves (ref_w) by the receiving antennas 106a and 106b.

(Receiving Antennas 106a and 106b)

The receiving antennas 106a and 106b output the received reflected waves ref_w to the corresponding receiving units 107a and 107b as an input signal (hereafter referred to as RF IN). In other words, the reflected waves ref_w received by the receiving antenna 106a are inputted, as an input signal RF IN, into the receiving unit 107a. Meanwhile, the reflected waves ref_w received by the receiving antenna 106b are inputted, as an input signal RF IN, into the receiving unit 107b.

(Receiving Units 107a and 107b)

The receiving unit 107a despreads reflected waves ref_w received by the receiving antenna 106a by using the delay code M2 generated by the delay code generation unit 103b. Furthermore, the receiving unit 107a generates an in-phase signal (Ia) and a quadrature signal (Qa) by performing quadrature demodulation (also called quadrature detection) of the despread reflected waves ref_w by using the carrier waves LO. The in-phase signal (Ia) is a signal which corresponds to an in-phase component of the carrier waves LO among the reflected waves ref_w despread by the receiving unit 107a. Meanwhile, the quadrature signal (Qa) is a signal which corresponds to a phase component which is in quadrature to the carrier waves LO among the reflected waves ref_w despread by the receiving unit 107a. The in-phase signal (Ia) and the quadrature signal (Qa) constitute a first complex baseband signal BBa corresponding to an intensity and a phase of the reflected waves ref_w received by the receiving antenna 106a.

The receiving unit 107b despreads the reflected waves ref_w received by the receiving antenna 106b by using the delay code M2 generated by the delay code generation unit 103b. Furthermore, the receiving unit 107b generates an in-phase signal (Ib) and a quadrature signal (Qa) by performing quadrature demodulation of the despread reflected waves ref_w by using the carrier waves LO. The in-phase signal (Ib) is a signal which corresponds to an in-phase component of the carrier waves LO among the reflected waves ref_w despread by the receiving unit 107b. Meanwhile, a quadrature signal (Qb) is a signal which corresponds to a phase component which is in quadrature to the carrier waves LO among the reflected waves ref_w despread by the receiving unit 107b. The in-phase signal (Ib) and the quadrature signal (Qb) constitute a second complex baseband signal BBb corresponding to an intensity and a phase of the reflected waves ref_w received by the receiving antenna 106b.

It is noted that the receiving unit 107b has the same configuration as that of the receiving unit 107a.

Figure 3:
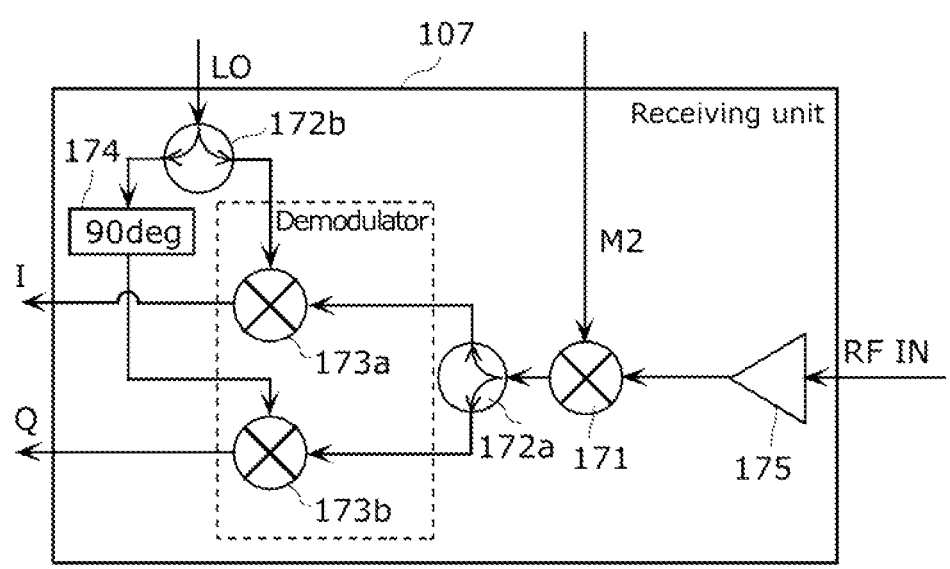
FIG. 3 is a block diagram showing a detailed configuration of a receiving unit of the radar apparatus according to Embodiment 1 of the present invention.

Here, with reference to FIG. 3, the configurations of the receiving units 107a and 107b are described as the receiving unit 107. It is noted that each of the receiving antennas 106a and 106b installed corresponding to the receiving unit 107 shown in FIG. 3 is described as the receiving antenna 106 without a specific distinction. Moreover, the in-phase signal (Ia) and the in-phase signal (Ib) are described as an in-phase signal (I), the quadrature signal (Qa) and the quadrature signal (Qb) are described as a quadrature signal (Q), and the first complex baseband signal BBa and the second complex baseband signal BBb are described as a complex baseband signal BB. Moreover, there is a case of being described as only a baseband signal.

The receiving unit 107, as shown in FIG. 3, includes a receiving amplifier 175, a despreading mixer 171, distributors 172a and 172b, demodulation mixers 173a and 173b, and a phase shifter 174.

The receiving amplifier 175 is an amplifier which amplifies a signal received by the receiving antenna 106. In other words, the receiving amplifier 175 amplifies an input signal RF IN. It is favorable that the receiving amplifier 175 be an amplifier which amplifies a weak received signal (same meaning as input signal RF IN) and be especially a low-noise amplifier which is carefully designed to minimize noise further added by the amplifier. The receiving amplifier 175 minimizes an influence of noise generated in a circuit at a subsequent stage by amplifying an intensity of a received signal while maintaining, at the output of the amplifier 175, a ratio of input signal intensity with respect to newly added noise at a maximum level.

The despreading mixer 171 corresponds to a despreading unit according to the present invention, and despreads, by using the delay code M2 which is delayed with respect to the spreading code M1, the reflected waves ref_w received by the receiving antenna 106a or the receiving antenna 106b. Specifically, the input signal RF IN amplified by the receiving amplifier 175 is despread. The despread signals are called despread waves.

In the case where a time to receive, after the radiation waves rad_w are radiated from the transmission antenna 105, the radiation waves rad_w which is reflected by the target 200 matches a delay time of the delay code M2 with respect to the spreading code M1, despread waves having a narrowband are generated in an output signal of the despreading mixer 171.

The frequency of the despread waves outputted at this time is a frequency of the carrier waves LO having a frequency of f0 provided to the transmission unit 104 having a Doppler shift by a radial velocity of the target 200.

The distributor 172a outputs, like, the distributors 102a and 102b, distributes an inputted signal and outputs a signal having the same frequency as the inputted signal. Specifically, the distributor 172a distributes despread waves generated by the despreading mixer 171, outputs one of the distributed despread waves to the demodulation mixer 173a, and outputs the other distributed despread waves to the demodulation mixer 173b. Likewise, the distributor 172b distributes the inputted carrier waves LO, outputs one of the distributed carrier waves LO to the demodulation mixer 173a, and outputs the other distributed carrier waves LO to the phase shifter 174. The phase shifter 174 makes a phase displacement of 90 degrees to the inputted carrier wave LO and outputs the result. In other words, the phase of the carrier waves LO inputted into the demodulation mixer 173a is different by 90 degrees from the phase of the carrier waves LO inputted into the demodulation mixer 173b.

The demodulation mixers 173a and 173b both correspond to a demodulator according to the present invention, and compose a quadrature demodulator which performs quadrature demodulation of the despread waves distributed by the distributor 172a by using the carrier waves LO and then generates a complex baseband signal BB composed of the in-phase signal (I) and the quadrature signal (Q). Specifically, the demodulation mixer 173a generates an in-phase signal (I) by demodulating, by using the carrier waves LO, the despread waves distributed by the distributor 172a. Meanwhile, the demodulation mixer 173b generates a quadrature signal (Q) by demodulating, by using the carrier waves LO whose phase is displaced by 90 degrees by the phase shifter 174, the despread waves distributed by the distributor 172a.

With this, the frequency of the complex baseband signal BB has a frequency which is a difference between a frequency of the input signal RF IN of the receiving unit 107 and a frequency f0 of the carrier waves LO. In other words, the reflected waves ref_w which are inputted into the receiving antenna 106 and have a round-trip delay time matching a delay time of the delay code M2 with respect to the spreading code M1 are, by the receiving unit 107, converted into a baseband signal BB which is a low-frequency signal having a Doppler frequency determined by a radial velocity of the target 200 which generates the reflected waves ref_w. Conversely, the reflected waves ref_w which are inputted into the receiving antenna 106 and have a round-trip delay time not matching a delay time of the delay code M2 with respect to the spreading code M1 is, by the receiving unit 107, converted into a signal which has a center frequency of zero and is spread to a wide band. A signal in which the center frequency is zero and is spread to a wide band makes little contribution to a low-frequency signal component which can usually be generated in a Doppler frequency range.

Accordingly, the radar apparatus 100 can, if only a signal component within a Doppler frequency range that can be usually generated is processed, selectively detect only reflected waves ref_w from the target 200 which is located in a specific distance region (hereafter referred to as range gate) which has a length determined by the chip rates of M1 and M2 before and after a distance determined by a delay time of the delay code M2 with respect to the spreading code M1.

Specifically, a maximum value fdmax of a Doppler frequency satisfies: fdmax=2×vmax×f0/c=22.2 kHz by using light velocity c where a frequency of the carrier waves is f0=60 GHz and a maximum radial velocity of an object is vmax=200 km/h.

Moreover, a relationship between a chip rate CR of the spreading code M1 and a length RG of a range gate is RG=c/(CR×2). In other words, RG=60 cm if CR=250 Mpbs.

Accordingly, the radar apparatus 100 can, in the case where a certain delay time is set as the delay code M2 with respect to the spreading code M1, selectively detect only a target which is in a range of 60 cm around a distance corresponding to the delay time. For example, when a delay time is set at 12 ns, a distance corresponding to the delay time 12 ns is 180 cm. Moreover, the radar apparatus 100 can selectively detect only the target 200 whose distance from the radar apparatus 100 is a range from 120 cm to 240 cm.

A detection region of the target 200, further in detail, depends on an autocorrelation property of the spreading code M1. For example, in the case where the spreading code M1 is an M-sequence code, an influence of a target reaches to adjacent range gates of a range gate including distance corresponding to a delay time. However, it is possible to be selectively detected in distinction from a target located in another range gate.

The first complex baseband signal BBa generated by the receiving unit 107a is a signal which is composed of one or more frequency components fk (k is an integer equal to or greater than one) of the Doppler frequency by the target 200 in a detection region corresponding to a delay time of the delay code M2 with respect to the spreading code M1. Each of the frequency components fk has a phase φk and an amplitude Ak. Accordingly, the first complex baseband signal BBa is not influenced by the Doppler frequency by the target 200 outside the detection region corresponding to the delay time of M2 with respect to the spreading code M1. It is noted that the amplitude Ak corresponds to intensity, meaning that when the amplitude Ak is large, the intensity is high.

(Control Unit 110)

The control unit 110 sets, in a predetermined order, a delay time of the delay code M2 generated by the delay code generation unit 103b with respect to the spreading code M1 generated by the spreading code generation unit 103a. The control unit 110 determines a delay time corresponding to each of the range gates and provides a delay time instruction to the delay code generation unit 103b.

With this, each of the first complex baseband signal BBa and the second complex baseband signal BBb becomes a reflected signal from a target located in the range gate. The control unit 110 sweeps, by sequentially setting the delay time of the delay code M2 with respect to the spreading code M1, a central position of the range gate in order to cover all the detection region of the target (hereafter referred to as range scan operation). Furthermore, the control unit 110 controls, by repeating the range scan operation, the delay time such that all range gates can obtain a time-series waveform of reflected waves ref_w.

Figure 4:
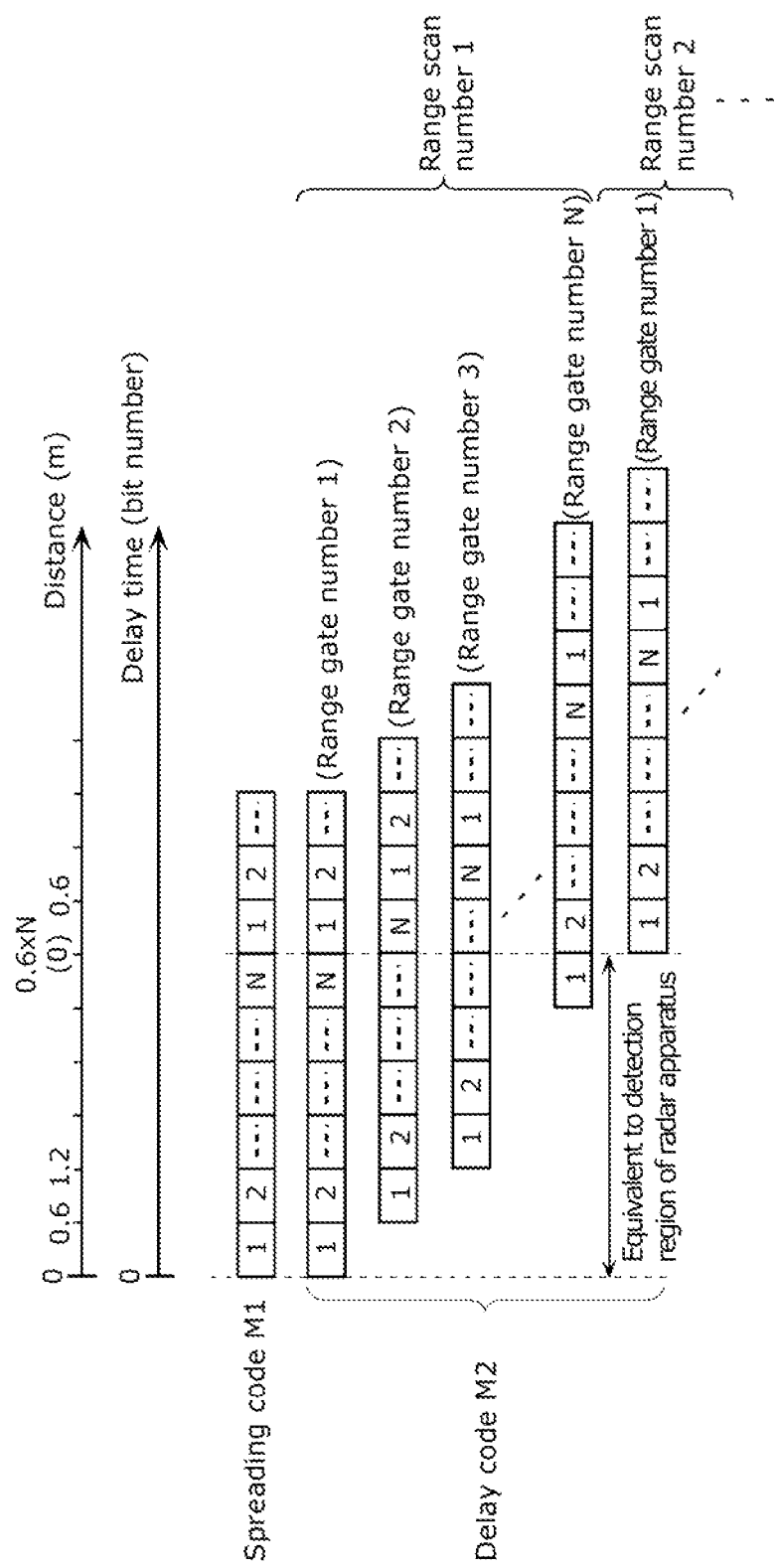
FIG. 4 illustrates how a delay time is controlled by a control unit of the radar apparatus according to Embodiment 1 of the present invention.

FIG. 4 is a diagram showing control of the delay time by the control unit 110. It is noted that here, as an example, a length of a range gate is 0.6 m and a detection region is 0.6×N [m].

In this case, the spreading code M1 generated by the spreading code generation unit 103a has a bit length L which can be set as a value greater than N, and the spreading code generation unit 103a repeatedly generates the spreading code M1. With the bit length L of the spreading code M1, a ratio of a signal outside the range gate leaked to the range gate can be decreased by setting L at a great value, but a measurement time is lengthened as a result and therefore the bit length L may be determined from the standpoint. Meanwhile, in order to cover the whole detection region of the target, the control unit 110 controls the delay time of the delay code M2 with respect to the spreading code M1 such that the delay code M2 with respect to the spreading code M1 is shifted from zero to N−1 chip in an ascending order. Then, the control unit 110, after setting the delay time such that the delay code M2 with respect to the spreading code M1 is shifted to zero to N−1 chip in an ascending order, sets the delay time such that a gap of the delay code M2 with respect to the spreading code M1 is zero chip, and then repeats the above mentioned operation.

As described above, the delay time of the delay code M2 with respect to the spreading code M1 corresponds to a distance from the radar apparatus 100 corresponding to the delay time. Accordingly, by implementing such that the control unit 110 is configured to sequentially shift the delay time of the delay code M2 generated by the delay code generation unit 103b, the radar apparatus 100 can detect each of the targets in N range gates having different distances from the radar apparatus 100. In other words, in the case where a gap of the delay code M2 with respect to the spreading code M1 is zero chip, a target of the first range gate can be detected, and in the case where a gap of the delay code M2 with respect to the spreading code M1 is i−1 chips ($1 \leq i \leq N$), a target of the i-th range gate can be detected.

In this way, a range scan operation (also called scan processing) is to sequentially shift, from zero to N−1 chips, the delay code M2 with respect to the spreading code M1, and a scan period is a period necessary to perform a single range scan operation. The control unit 110 repeats the above described range scan operation for M scan periods. It is noted that hereafter, an i-th range gate is described as a range gate number i, and j-th time range scan operation is described as a range scan number j.

As described above, the delay code M2 generated by the delay code generation unit 103b through control of a delay time by the control unit 110 is the same code as the spreading code M1, and N codes having delay times which are mutually different with respect to the spreading code M1. Specifically, the N delay codes M2 as shown in FIG. 4 are codes each of which is sequentially shifted by a single bit of the spreading code M1. In other words, the delay code M2 is a code which is sequentially shifted with respect to the spreading code M1 by a predetermined time. The predetermined time is a bit time that is a time that gives a bit of the spreading code M1. For example, in the case where a chip rate CR of the spreading code M1 is 250 Mpbs (also called cps), the predetermined time is 4 ns. In other words, the N delay codes M2 are codes in which each of the spreading codes M1 is shifted by 4 ns.

Moreover, a distance of the range gate from the radar apparatus 100 is a distance from the radar apparatus 100 to any of the points included in the range gate, and is favorably a distance to a middle point of the range gate. For example, in the case where a length of the range gate is 0.6 m, a distance of the third range gate from the radar apparatus 100 is favorably 1.8 m, that is, a middle point of a distance of 1.5 m from the radar apparatus 100 which is shortest among the third range gates, and 2.1 m, a distance from the radar apparatus 100 which is longest among the third range gates.

(Signal Processing Unit 108)

The signal processing unit 108 is, for example, a Digital Signal Processor. The signal processing unit 108 performs signal processing of the first complex baseband signal BBa composed of an in-phase signal (Ia) and a quadrature signal (Qa) generated by the receiving unit 107a, and the second complex baseband signal BBb composed of an in-phase signal (Ib) and a quadrature signal (Qb) generated by the receiving unit 107b. Moreover, the signal processing unit 108 includes signal storage units 181a and 181b, Doppler frequency discrimination units 182a and 182b, a direction of arrival calculation unit 183, an object detection unit 184, and a memory control unit 185.

The signal storage unit 181a stores a time-series waveform of the first complex baseband signal BBa composed of an in-phase signal (Ia) and a quadrature signal (Qa) both generated by the receiving unit 107a in association with a range gate number which is assigned to identify each of the range gates sequentially set by the control unit 110.

The signal storage unit 181b stores, in association with a range gate number, a time-series waveform of the second complex baseband signal BBb composed of an in-phase signal (Ib) and a quadrature signal (Qb) both generated by the receiving unit 107b. It is noted that the signal storage unit 181b has the same configuration as that of the signal storage unit 181a. Moreover, the signal storage unit 181a and the signal storage unit 181b correspond to the storage unit according to the present invention.

With reference to FIG. 5, configurations of the signal storage units 181a and 181b are described as a configuration of the signal storage unit 181.

The signal storage unit 181 is configured such that the complex baseband signal BB composed of an in-phase signal (I) and a quadrature signal (Q), for each of the range gates corresponding to a delay time set by the control unit 110, is stored for each of the range scans. Specifically, the signal storage unit 181 is constituted as a memory circuit which stores a two-dimensional arrangement of (N×M) elements that are a combination of N range gate numbers and M range scan numbers. Moreover, an in-phase signal (I) and a quadrature signal (Q) can be stored in each of the elements. In other words, the signal storage unit 181 holds an in-phase signal (I) and a quadrature signal (Q) in association with a range gate corresponding to the delay time in the delay code generation unit 103b and a range scan. In other words, the signal storage unit 181 stores a complex baseband signal BB generated each by the receiving unit 107a and the receiving unit 107b in association with the delay time in the delay code generation unit 103b and the range scan number.

Write and read are controlled, by the memory control unit 185, on the signal storage unit 181 of the complex baseband signal BB composed of an in-phase signal (I) and a quadrature signal (Q).

Figure 6A:
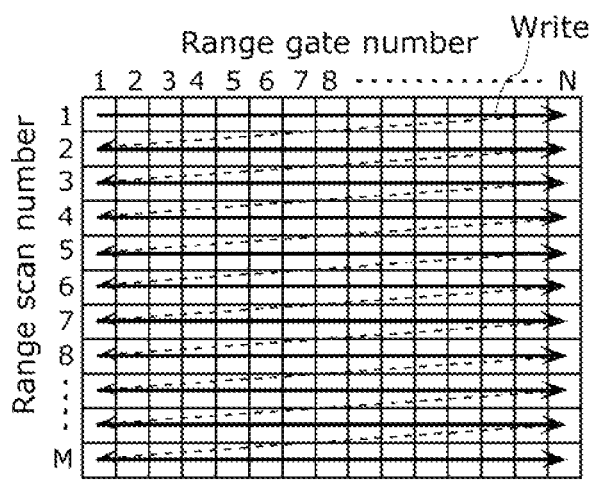
FIG. 6A is a diagram showing an order in which a complex baseband signal is stored in the signal storage unit of the radar apparatus according to Embodiment 1 of the present invention.

FIG. 6A shows how a complex baseband signal is stored in the signal storage unit 181. In other words, FIG. 6A shows how the complex baseband signal outputted from the receiving unit 107 is written by the memory control unit 185. In FIG. 6A, a horizontal axis shows a range gate number (1, 2, 3, ... N) and a vertical axis shows a sweep number (1, 2, 3, ... M). It is noted that a sweep number is the same as a range scan number. Moreover, hereafter, a complex baseband signal in a range scan of an i-th range gate ($1 \leq i \leq N$) and a j-th range scan ($1 \leq j \leq M$) will be described as Rij.

Every time the control unit 110 switches a range gate, the memory control unit 185 stores a complex baseband signal BB (in-phase signal (I) and quadrature signal (Q)) in a storage position of the signal storage unit 181 corresponding to a range gate number that is switched and a range scan number. It is noted that the storage position corresponding to the range gate number and the range scan number may be determined in advance or may be dynamically allocated.

Moreover, the memory control unit 185 sequentially changes a storage location by advancing a range scan number by only one every time a range scan is completed. In other words, after an in-phase signal (I) and a quadrature signal (Q) of an N element corresponding to N range gate numbers of the j-th range scan number are written in the signal storage unit 181, an in-phase signal (I) and a quadrature signal (Q) of a (j+1) th range scan number are written in the signal storage unit 181. With this, the signal storage unit 181 stores, with respect to all the range gates, a complex baseband signal BB composed of a time-series in-phase signal (I) and a quadrature signal (Q).

In the case where a baseband signal BB is already stored in all storage locations of the signal storage unit 181, the memory control unit 185 overwrites an old baseband signal BB which is stored in a storage location corresponding to the present range gate number and the present range scan number. With this, it is possible to maintain a state in which the newest baseband signal BB continuing in a range scan direction, that is, continuing in a temporal sequence is stored. In this case, in order to show that a period of processing by the Doppler frequency discrimination units 182a and 182b to be described below corresponds to which range scan number of the signal storage unit 181, it is favorable that a location to store the latest range scan number be prepared as a time-series discontinuity (not illustrated).

Figure 6B:
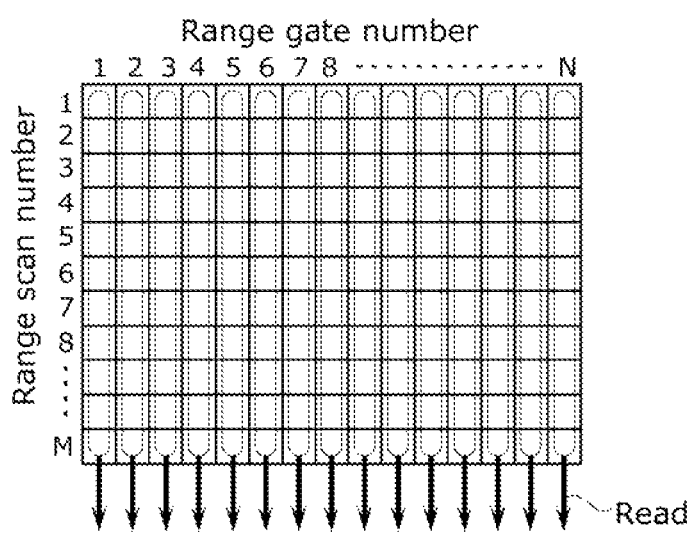
FIG. 6B is a diagram showing how the complex baseband signal is read out from the signal storage unit of the radar apparatus according to Embodiment 1 of the present invention.

FIG. 6B shows how a complex baseband signal stored in the signal storage unit 181 is read out. In other words, how a complex baseband signal is read out by the memory control unit 185 is shown.

The memory control unit 185 sequentially reads out, from the signal storage unit 181, M baseband signals BB corresponding to the same range gate and mutually different range scans. It is noted that the memory control unit 185 may, after all (N×M) elements are stored, read out M baseband signals stored corresponding to the same range gate number and mutually different range scan numbers, and, when a baseband signal corresponding to an M-th range scan number of a certain range gate number is stored, the memory control unit 185 may read out M baseband signals corresponding to the range gate number.

In this way, the memory control unit 185 repeatedly writes by M range scans, in the signal storage unit 181, distances to N range gates which correspond to N delay codes generated by the delay code generation unit 103b and have mutually different distances from the radar apparatus 100, and baseband signals R1j to RNj that are N baseband signals BB corresponding to the same range scan. Moreover, the memory control unit 185 sequentially reads out, from the signal storage unit 181, a group of baseband signals Ri1 to RiM that are M baseband signals BB corresponding to the same range gate and mutually different range scans.

In this way, the Doppler frequency discrimination units 182a and 182b perform frequency analysis on M baseband signals Ri1 to RiM which correspond to the same range gate and mutually different range scans both read out by the memory control unit 185.

It is noted that in FIG. 1, the radar apparatus 100 includes the signal storage unit 181a provided corresponding to the receiving unit 107a and the signal storage unit 181b provided corresponding to the receiving unit 107b. However, the radar apparatus 100 may have a single storage device and may use different regions of the storage device as the signal storage unit 181a corresponding to the receiving unit 107a and as the signal storage unit 181b corresponding to the receiving unit 107b.

In FIG. 1, the Doppler frequency discrimination units 182a and 182b discriminate a complex base band signal for each frequency component and outputs a phase and an intensity of the received signal for each Doppler frequency component. Each of the Doppler frequency discrimination units 182a and 182b corresponds to the Doppler frequency detection unit according to the present invention and detects, by performing frequency analysis on M baseband signals Ri1 to RiM each of which is read out by the memory control unit 185 and has the same range number, (i) a Doppler frequency component which is a frequency component representing a difference between a frequency of reflected waves ref_w and a frequency of carrier waves LO in each of the range gates and (ii) a phase and an intensity corresponding to the Doppler frequency component, by each corresponding to the demodulator of the receiving unit 107a and the receiving unit 107b.

Figure 7:
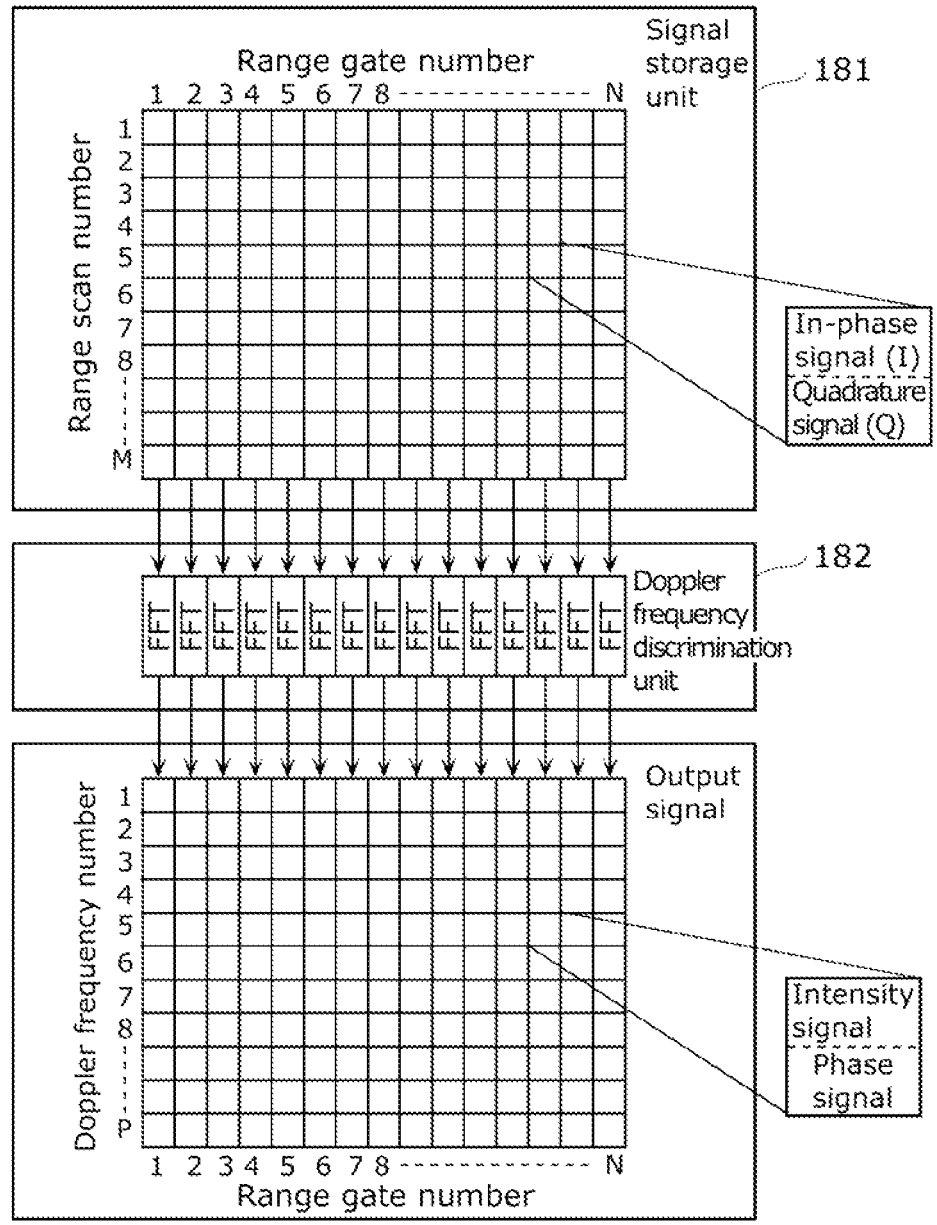
FIG. 7 is a diagram showing a configuration of a Doppler frequency discrimination unit and a structure of an input signal and an output signal of the radar apparatus according to Embodiment 1 of the present invention.

With reference to FIG. 7, the Doppler frequency discrimination units 182a and 182b and a structure of the input and output signal will be described. It is noted that the Doppler frequency discrimination unit 182a and the Doppler frequency discrimination unit 182b have the same configurations, and therefore, in this case, they are described as the Doppler frequency discrimination unit 182. Input signals of the Doppler frequency discrimination units 182a and 182b are each a complex baseband signal BB (complex baseband signal Rij) stored in the corresponding signal storage unit 181. An inside of the Doppler frequency discrimination unit 182 is composed of a Fast Fourier Transform (FFT) which is independent for each of the range gates.

By temporarily storing a received signal in the signal storage unit 181 by using the configuration, it is possible, with respect to duration of a time-series signal necessary to obtain an intended resolution by the Doppler frequency discrimination unit, to embed a range scan operation within the duration. Accordingly, the configuration can significantly decrease an overall processing time compared with the configuration which, by avoiding using the signal as storage unit and directly connecting the receiving unit with the Doppler frequency discrimination unit, waits for completion of execution of Doppler frequency discrimination processing and then sequentially changes a range gate.

Specifically, a relationship between the radial velocity v and the Doppler frequency fd is $fd=2\times v/\lambda$. Because a wavelength $\lambda$ is $c/f0$ (c is light velocity and f0 is frequency of carrier waves LO), a Doppler frequency resolution fres needs to be 40 hz when a velocity resolution 0.1 m/s of a radial velocity of the target can be obtained. Accordingly, an observation time T for each of the range gates needs to be $T=1/fres=25$ ms. In other words, 25 ms are necessary from a time to perform sampling of a baseband signal Ri1 of an i-th range gate in the first time of range scan to a time to perform sampling of a baseband signal RiM of an i-th range gate in an M-th time of range scan.

For example, in the case where an observation distance region (detection region of radar apparatus 100) is zero to 20 m and a length of a range gate is 0.6 m, the number of range gates is 34. Accordingly, in the case where, without using the memory control unit 185, sampling is performed for a baseband signal RiM by taking an observation time T for each of the range gates in order to satisfy the above mentioned Doppler frequency resolution fres, an observation time for all range gates needs to be $T\times34=850$ ms.

Conversely, in the present embodiment, the memory control unit 185 makes it possible to, in a period from sampling of a baseband signal Rij of an i-th range gate in a j-th range scan to sampling of a baseband signal Rij+1 of the i-th range gate in a (j+1)th range scan, perform sampling of a baseband signal other than the i-th range gate. In other words, during an observation time 25 ms necessary for a single range gate, it is possible to perform sampling of a baseband signal of a different range gate, with a result that an overall observation time is also 25 ms for all range gates and the observation time can be reduced by the number of range gates. In other words, a speed of signal processing by the Doppler frequency discrimination unit 182a and the Doppler frequency discrimination unit 182b can be increased 34 times.

It is noted that the Doppler frequency discrimination units 182a and 182b may use an algorithm other than the Fast Fourier Transform and a frequency spectrum of intensity and phase may be calculated from a time-series wave form of a complex baseband signal. For example, the Doppler frequency discrimination units 182a and 182b may use an algorithm such as a discrete cosine transform or a wavelet transform.

In this way, the Doppler frequency discrimination unit 182 detects, by performing frequency analysis on M baseband signals Ri1 to RiM each of which is read out by the memory control unit 185 and has the same range gate number, (i) a Doppler frequency component which is a frequency component representing a difference between a frequency of reflected waves ref_w and a frequency f0 of carrier waves LO in each of the range gates and (ii) a phase and an intensity corresponding to the Doppler frequency component, by each corresponding to the demodulator of the receiving unit 107a and the demodulator of the receiving unit 107b.

The Doppler frequency component detected by the frequency analysis by the Doppler frequency discrimination unit 182 includes P frequency bands. The P frequency bands are specified by Doppler frequency numbers 1 to P. In other words, an output signal from the Doppler frequency discrimination unit 182 is an intensity signal or a phase signal, both of which are associated with a range gate number and a Doppler frequency number.

FIG. 1 will be referred again. The object detection unit 184 corresponds to the distance estimation unit according to the present invention, and estimates, as a distance from the radar apparatus 100 to the target 200, a distance from the radar apparatus 100 of a range gate in which a Doppler frequency component having an intensity equal to or greater than a predetermined threshold value is detected by the Doppler frequency discrimination units 182a and 182b. In other words, the object detection unit 184 determines, by using intensity signal outputs of the Doppler frequency discrimination units 182a and 182b, that there is a target in a range gate having a certain level or more of intensity output in any Doppler frequency intensity signal output, calculates a signal intensity in the Doppler frequency of the range gate.

With this, information about a distance from the radar apparatus 100 to the target is obtained, making it possible to perform detailed information processing. Specifically, the reflected waves ref_w received by the receiving antennas 106a and 106b are despread with the delay code M2, which is generated by the delay code generation unit 103b and having a predetermined delay time with respect to the transmission code M1. Accordingly, only in the case where a round-trip propagation delay time of a signal which is radiated from the transmission antenna 105, is reflected by the target, and is propagated to the receiving antennas 106a and 106b matches a delay time of the delay code M2, the carries waves LO which have a Doppler frequency shift corresponding to a radial velocity of the target is reproduced. With this, by the Doppler frequency discrimination units 182a and 182b, the Doppler frequency corresponding to the radial movement velocity is outputted. However, in the case where a round-trip delay time is not identical to a delay time of the delay code M2, a frequency spectrum is in a state of being spread in a wide band depending on a chip rate of a transmission spreading code M1, this influence little contributes to a result of detection by the Doppler frequency discrimination units 182a and 182b. Accordingly, in the case where a Doppler frequency of one of the Doppler frequency discrimination units 182a and 182b has an intensity equal to or greater than a predetermined threshold value at a certain delay time, it can be determined that there is a target at a distance which electromagnetic wave propagates in half of the delay time.

As an example of a method of determining the existence of the target, the object detection unit 184 determines that there is a target in the case where an intensity a that is an intensity signal outputted from the Doppler frequency discrimination unit 182a and an intensity b that is an intensity signal outputted from the Doppler frequency discrimination unit 182b, which are the intensity values in a Doppler frequency number that is mutually equal among the intensities of the Doppler frequency discrimination unit 182a and the intensities of the Doppler frequency discrimination unit 182b, both have intensities equal to or greater than a certain level. With this method, a probability of erroneously determining the existence is decreased but a target detection rate is also decreased.

Moreover, as another method of determining the existence of the target, the object detection unit 184 determines that there is the target in the case one of the intensity a and the intensity b has an intensity equal to or greater than a certain level. With this method, a target detection probability can be increased, but a probability of erroneously determining the existence is increased.

Accordingly, as a method of determining the existence of the target, one of the above mentioned methods can be used depending on a purpose. It is noted that not only the above mentioned examples but also another method depending on the intensity a and the intensity b may be adopted. For example, the object detection unit 184 may use, as an intensity used for determining the existence of the target, an average value of the intensity a and the intensity b, one of the intensities having a greater intensity as a representative value, and one of the intensities having a smaller intensity as a representative value. Moreover, the object detection unit 184 may use one of the methods according to a purpose. It is noted that another calculation method depending on the intensity a and the intensity b may be adopted. Moreover, considering the values of the intensity a and the intensity b in a range gate within a certain distance region from a range gate corresponding to an interested delay time, it is possible to determine the existence of an object in the range gate corresponding to the interested delay time. The determination method is effective when detection of a person, a vehicle, and the like against a background of objects which continuously exist in a certain distance region such as reflection on a road surface and the like.

Moreover, the object detection unit 184 outputs, with respect to the direction of arrival calculation unit 183, a signal indicating a range gate in which there is a target and a signal which indicates a Doppler frequency. Then the object detection unit 184 stores each of the directions of the targets calculated by the direction of arrival as calculation unit 183 by associating each direction with a Doppler frequency and a range gate of each of the targets.

The direction of arrival calculation unit 183 corresponds to the direction estimation unit according to the present invention, and estimates, as a direction of a target, a direction of arrival of reflected waves ref_w including a Doppler frequency component having an intensity equal to or greater than a predetermined threshold value which is detected by the Doppler frequency discrimination units 182a and 182b. In other words, the direction of arrival calculation unit 183, in a range gate and a Doppler frequency in which it is determined by the object detection unit 184 that there is a target, estimates, from a difference between a phase detected by the Doppler frequency discrimination unit 182a and a phase detected by the Doppler frequency discrimination unit 182b, a direction of arrival of reflected waves ref_w having the Doppler frequency of the range gate and outputs an estimation result to the object detection unit 184. Specifically, it is possible to know a direction of a target, regarding the Doppler frequency having an intensity equal to or greater than a threshold value, by using a phase difference between the receiving antenna 106a and the receiving antenna 106b and a physical distance between the receiving antenna 106a and the receiving antenna 106b.

Figure 8:
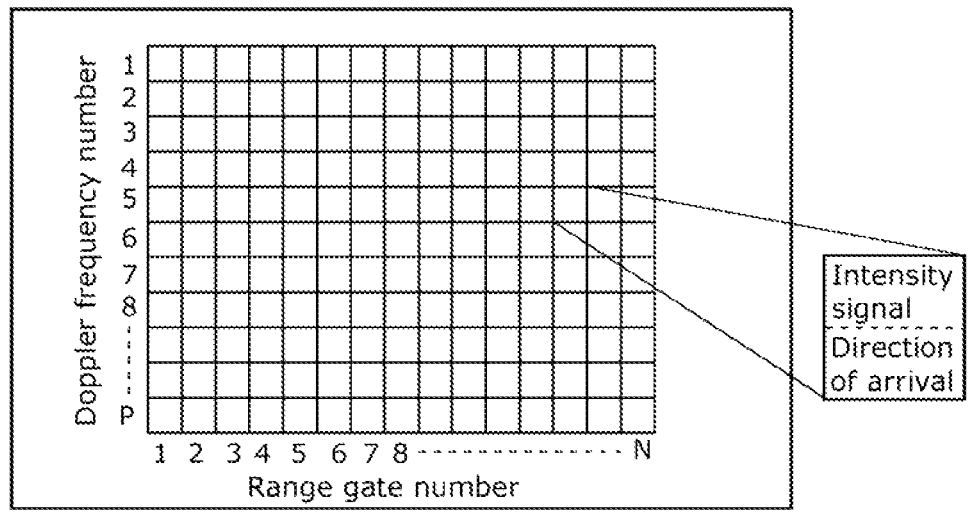
FIG. 8 is a diagram showing a structure of an output signal of an object detection unit of the radar apparatus according to Embodiment 1 of the present invention.

FIG. 8 is a diagram showing a signal structure of a result of the above mentioned processing. Specifically, FIG. 8 is a diagram showing a signal that is data including an intensity signal detected each by the Doppler frequency discrimination units 182a and 182b and a direction of arrival estimated by the direction of arrival calculation unit 183.

As shown in FIG. 8, the object detection unit 184 holds an intensity signal and a direction of arrival corresponding to a range gate number and a Doppler frequency number. In this case, in a combination of a range gate and a Doppler frequency that it is not determined that there is an object, a direction of arrival is not calculated and there is no meaning.

It is noted that the object detection unit 184 may output data shown in FIG. 8 to outside of the radar apparatus 100.

Moreover, the radar apparatus 100 may, by setting, at zero, a signal intensity (threshold value) that is a reference of determining the existence of an object, calculate intensity signals and directions of arrival corresponding to all range gates and Doppler frequencies. As an intended use of an output signal in this case, for example, it is considered that by performing a statistical treatment, the existence determination or direction of the target is determined with respect to a weak reflected signal ref_w that is extremely difficult to determine the existence of the target.

Next, operations of the radar apparatus 100 configured above will be described.

Figure 9:
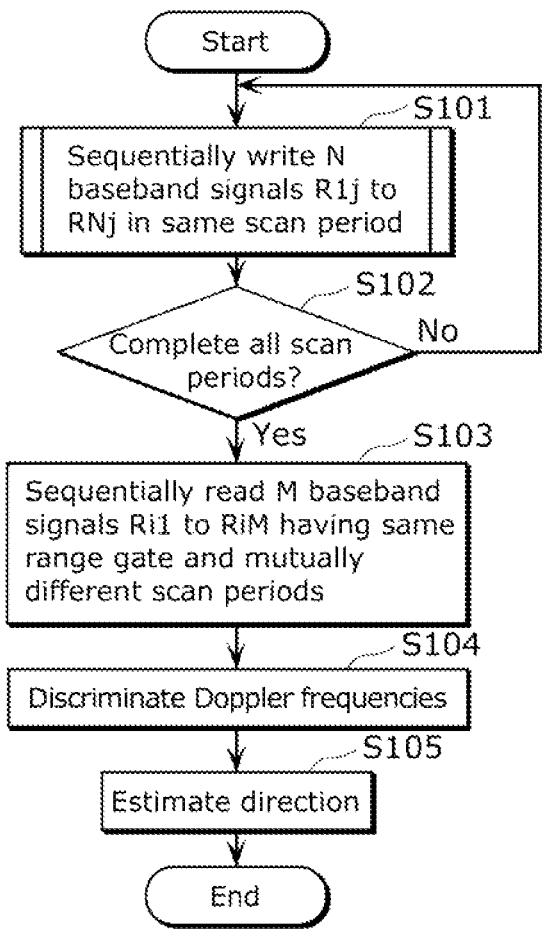
FIG. 9 is a flowchart showing operations of the radar apparatus according to Embodiment 1 of the present invention.

FIG. 9 is a flowchart showing the operations of the radar apparatus 100.

First, the memory control unit 185 sequentially writes N baseband signals in the same scan period in the signal storage units 181a and 181b (step S101). In other words, the N baseband signals R1j to RNj having the same range scan number and different range gate numbers are sequentially written in the signal storage units 181a and 181b.

Figure 10:
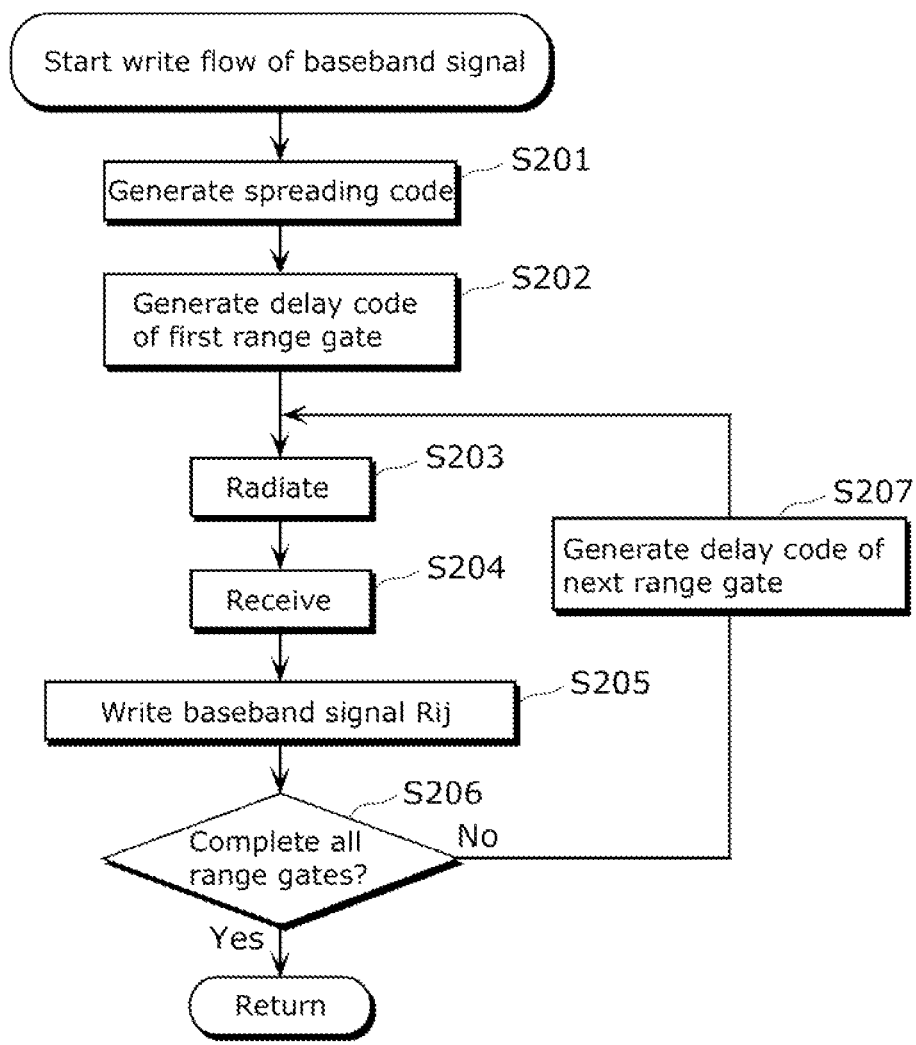
FIG. 10 is a flowchart showing detailed operations of write processing of the baseband signal of FIG. 9 of the radar apparatus according to Embodiment 1 of the present invention.

FIG. 10 is a flowchart showing detailed operations of step S101 of FIG. 9.

The spreading code generation unit 103a generates a spreading code M1 at a timing when it is instructed by the control unit 110 (step S201).

The delay code generation unit 103b generates a delay code M2 at a delay time instructed by the control unit 110. Specifically, the delay code generation unit 103b generates the delay code M1 corresponding to the first range gate (for example, the No. 1 range gate) (step S202).

Then, by despreading carrier waves LO through the a transmission unit 104 by using the spreading code M1 generated by the spreading code generation unit 103a, a transmission signal RF OUT is generated. The transmission antenna 105 radiates the transmission signal RF OUT generated by the transmission unit 104 as radiation waves rad_w (step S203).

Next, the receiving antennas 106a and 106b receive reflected waves ref_w reflected by the target 200 (step S204). Then the received reflected waves ref_w are despread and quadrature demodulated by the receiving units 107a and 107b, and then outputted as a baseband signal Rij to the signal processing unit 108.

The memory control unit 185 writes the baseband signal Rij outputted from the receiving units 107a and 107b in the signal storage units 181a and 181b (step S205). Specifically, the memory control unit 185 writes, in association with a range gate number and a range scan number, the baseband signal Rij outputted from the receiving unit 107a in the signal storage unit 181a and the baseband signal Rij outputted from the receiving unit 107b in the signal storage unit 181b.

Next, the memory control unit 185 determines whether or not write of baseband signals R1j to RNj of all the range gates is completed (step S206). In the case where the write is not completed (No in step S206), the delay code generation unit 103b generates a delay code M2 of the next range gate (step S207) and returns to step S203

Meanwhile, in the case where the write of the baseband signal Rij of all the range gates is completed (Yes in step S206), the write of the baseband signal is completed.

Description will be made again with reference to FIG. 9. The memory control unit 185 determines whether or not the write of a baseband signal in the signal storage units 181a and 181b is completed for the whole scan period (step S102). In other words, the memory control unit 185 determines whether or not the M-th time of range scan is completed. If not completed (No in step S102), a process is returned to the write processing of the baseband signal (step S101).

Meanwhile, in the case where the write of the baseband signal is completed for the whole scan period (Yes in step S102), the memory control unit 185 sequentially reads out M baseband signals Ri1 to RiM having the same range gate and mutually different scan periods (step S103).

The Doppler frequency discrimination unit 182a and the Doppler frequency discrimination unit 182b perform frequency analysis, for each of the range gates, on M baseband signals Ri1 to RiM read out from the signal storage units 181a and 181b by the memory control unit 185. In other words, the Doppler frequency discrimination unit 182a and the Doppler frequency discrimination unit 182b discriminate Doppler frequencies (step S104).

Later, the direction of arrival calculation unit 183 estimates a direction of arrival of reflected waves ref_w (step S105).

As described above, the radar apparatus 100 according to the present invention includes: the transmission unit 104 which generates a transmission signal RF OUT by spreading carrier waves LO by using the spreading code M1; the transmission antenna 105 which radiates a transmission signal RF OUT as radiation waves rad_w; the receiving antenna 106a and the receiving antenna 106b which receive reflected waves ref_w as a result that radiation waves rad_w are reflected by an object 200; the delay code generation unit 103b which repeats a range scan, for M range scan periods, which sequentially generates N delay codes M2 that are the same codes as the spreading code M1 and have different distances from the radar apparatus 100 in a scan period for scanning N range gates having different distances from the radar apparatus 100; a plurality of the despreading mixers 171 each of which, corresponding to each of the receiving antenna 106a and the receiving antenna 106b, despreads reflected waves ref_w received by the corresponding receiving antenna by using N delay codes M2; a plurality of the demodulators each of which, corresponding to each of the plurality of the despreading mixers 171, by performing quadrature demodulation of reflected waves ref_w despread by the despreading mixer 171 corresponding by using the carrier waves LO, generates a baseband signal Rij (i is an integer from one to N, j is an integer from one to M) corresponding to reflected waves ref_w received by the corresponding receiving antenna; the signal storage unit 181a and the signal storage unit 181b each of which, in association with a delay time and a range scan period in the delay code generation unit 103b, stores a baseband signal Rij generated by each of the demodulators; the memory control unit 185 which repeatedly writes, by M range scans, in the signal storage unit 181a and the signal storage unit 181b, N baseband signals R1j to RNj corresponding to mutually different distances and corresponding to N delay codes M2 in the delay code generation unit 103b and a single scan period, and sequentially reads out, from the signal storage unit 181a and the signal storage unit 181b, a group of M baseband signals Ri1 to RiM corresponding to the same distances from the radar apparatus 100 and mutually different range scans; the Doppler frequency discrimination unit 182a and the Doppler frequency discrimination unit 182b which detect corresponding to each of the plurality of demodulators, by performing frequency analysis on M baseband signals Ri1 to RiM having the same distances read out by the memory control unit 185, a Doppler frequency component that is a frequency component representing a difference between reflected waves ref_w and carrier waves LO in each of the range gates and a phase and intensity corresponding to the Doppler frequency; and the direction of arrival calculation unit 183 which, by calculating, from the detected phase corresponding to each of the demodulators, a phase difference between the demodulators and detecting, from the calculated phase difference, a direction of arrival of reflected waves ref_w in each of the range gates, estimates a direction of the target 200.

With this, a baseband signal Rij which is a range scan result of plural times of delay time is stored in the signal storage units 181a and 181b. Moreover, the radar apparatus 100 performs Doppler frequency discrimination processing of baseband signals Ri1 to RiM having the same delay times for each of the range gates. Accordingly, compared with a configuration in which Doppler frequency discrimination processing is performed for baseband signals Ri1 to RiM without through the signal storage unit 181a and the signal storage unit 181b and a delay time setting is changed every time the Doppler frequency discrimination processing is completed, the radar apparatus 100 can decrease time necessary to detect a target in the detection region. Accordingly, the radar apparatus 100 can enhance a function of estimating a direction of a moving target.

Moreover, the radar apparatus 100 according to the present invention performs baseband signal processing corresponding to reflected waves ref_w for each of the range gates which is defined as a detection region that is a region encircled by the distances from the radar apparatus 100 which are k-th and (k+1)th time (k is an integer equal to or greater than zero) the distance determined by a chip rate of the spreading code M1. Accordingly, the radar apparatus 100 can discriminate, even though there is a target having the same radial velocity outside a range gate, a frequency of reflected waves ref_w from the range gate without an influence of reflected waves ref_w from the target. In other words, the radar apparatus 100 can detect, in the case where there is a moving target in the range gate, a Doppler frequency that is a frequency of a difference between reflected waves ref_w from the target in the range gate and carrier waves LO, even in the case where there is a range gate having the same radial velocity outside the range gate.

Moreover, the radar apparatus 100 uses an M-sequence code as the spreading code M1 and the delay code M2. Here, a mutual correlation is small between the spreading code M1 and the delay code M2 both using an M-sequence code and other signals. With this, the radar apparatus 100 can identify a self-emitted signal by a code even though there is an influence of radio waves radiated from another radar system and the like. In other words, the radar imaging apparatus 100 can decrease an influence of the other radar system. As a result, there is a significant decrease in a possibility that a DOA is indefinite due to an influence from an object whose frequency is near a Doppler frequency or from interference by another system, with a result that the radar apparatus 100 can detect a direction of an object with a simple configuration and in a short time.

Moreover, in the above mentioned processing, favorably, the delay code generation unit 103b has a configuration which determines, as a unit, a bit time corresponding to a bit of the spreading code M1 and generates a code M2 which is delayed with respect to the spreading code M1. In other words, N delay codes M2 have mutually different delay times with respect to the transmission code M1, and each of the delay time is an integral multiple of a bit time that is a time that gives a bit of the transmission code M1.

The configuration is the most effective configuration for detecting all objects in a specific distance region as long as the reflected signal intensity has a receivable intensity. In other words, use of time shorter than a bit time as a unit is unfavorable because it leads to an increase in the number of range gates and an eventual increase in the signal processing burden. Moreover, use of time longer than a bit time as a unit is unfavorable because a range gate does not continue and a plurality of distance regions generate in which an object cannot be detected. Meanwhile, use of a bit time as a unit is favorable because this makes it possible to simplify a configuration of the delay code generation unit 103b. In other words, it is possible to configure the spreading code generation unit 103a and the delay code generation unit 103b by using a synchronous circuit determining a bit time as a clock cycle. In order that a time shorter than a bit time is used as a unit, a complicated configuration is necessary. For example, there is a method of adopting, in these circuits, a synchronous circuit which uses a clock having a cycle shorter than a bit time and having a high frequency. Alternately, there is a method of configuring these circuits as an asynchronous circuit by using an individual clock having a different frequency between the spreading code generation unit 103a and the delay code generation unit 103b. But it is difficult to say that these are efficient implementation methods.

In other words, by generating, through the delay code generation unit 103b, a code M2 which is delayed with respect to the spreading code M1 by determining, as a unit, a bit time corresponding to a bit of the spreading code M1, a configuration can be realized in which all objects within a specific distance region can be detected as long as reflected waves ref_w which a target reflects have an identifiable intensity in the signal processing unit 108 while a configuration of the delay code generation unit 103b is simplified.

Moreover, it is favorable that the control unit 110 control a delay time sequentially set at the delay code generation unit 103b such that a corresponding range gate continues and is a monotonous increase or a monotonous decrease with respect to a sequence of setups. In other words, the delay time is any of is K-th time to (K+N−1)th time of the bit time (K is an integer) of a transmission code M1, and it is favorable that the control unit 110, in scanning processing, generate N delay codes M2 by incrementing the delay time by a bit time from K-th time the bid time to (K+N−1) th the bit time, or by decrementing the delay time by a bit time from (K+N−1) th the bit time to K-th time the bit time.

In the case where, by controlling in this way, there is an influence of a transient response of a received signal by a range scan operation on range gates before and after a range gate in which an object is detected, the influence also only reaches adjacent region with respect to distance and therefore there is no practical problem. However, in the case where a delay time sequentially set in the delay code generation unit 103b by the control unit 110 is controlled such that the corresponding range gate does not continue, an influence of a transient response of a received signal occurs in isolation in a position different from a distance where there is an object. This increases a possibility that an erroneous result is produced as if there was a target at the position, and this is unfavorable.

In other words, by realizing that the delay time becomes a monotonous increase or a monotonous decrease such that a corresponding range gate continues, a configuration of the delay code generation unit 103b can be further simplified and interference among a plurality of range gates can be reduced.

Moreover, in the present embodiment, the number of receiving antennas is two, but the number of antennas can be increased to three or more.

For example, by providing the receiving antennas at three vertex locations of a right angled triangle, it is possible to detect an object in a three-dimensional space. In other words, between the two antennas, according to the above described procedure, a direction of arrival in a plane including a first baseline made by the two antennas is calculated. Then by selecting other two antennas to constitute a second baseline perpendicular to the first baseline, a as direction of arrival of the object is estimated in a plane including the second baseline according to the above described procedure. Then, by integrating the results, the direction of the object can be spatially detected. Furthermore, the integration of the detection results with information about the distance of the object makes it possible to detect the object in a three-dimensional space.

Moreover, the radar apparatus may use three or more antennas. An increase in the number of antennas makes it possible to redundantly calculate directions of arrival with respect to a single object and a subsequent average of the directions makes it possible to decrease an influence of noise. Moreover, by providing antennas in a non-uniformly spaced manner, uncertainty about a direction of arrival which can be induced by a relationship between an interval of adjacent antennas and a wavelength of transmission waves can be eliminated.

(Modification of Embodiment 1)

Moreover, in the Embodiment 1, the object detection unit 184 can discretely detect an existence position of a target by determining a range gate as a unit, and furthermore, the object detection unit 184 may calculate a detailed existence position within the range gate, which is more detailed than a length of the range gate RG=c/(2×CR) calculated by using a light velocity c with respect to a chip rate CR of the spreading code M1 and the delay code M2.

A radar apparatus according to the present modification is almost the same as the radar apparatus according to Embodiment 1, but the difference from Embodiment 1 is that the object detection unit 184 (i) identifies, from an intensity distribution of the Doppler frequencies with respect to a delay time for each of the Doppler frequencies detected by the Doppler frequency discrimination unit 182a and the Doppler frequency discrimination unit 182b, a peak intensity in which an intensity becomes maximum, and (ii) estimates a distance from the radar apparatus to the target by determining, as a resolution, a distance smaller than a distance corresponding to a bit time, and by performing interpolation processing by using the identified peak intensity, a pre-peak intensity which is an intensity of with respect to a delay time shorter by a bit time than the delay time corresponding to the identified peak intensity, a post-peak intensity which is an intensity with respect to a delay time delayed by a bit time compared with the delay time corresponding to the identified peak intensity.

Specifically, descriptions will be made with reference to FIG. 11A and FIG. 11B.

The object detection unit 184 calculates, from a change in an intensity value with respect to a range gate number for each of the Doppler frequencies, a peak in which an intensity becomes maximum. Then the object detection unit 184, for each of the peaks, extracts Pb having a great intensity, among the peak intensity Pa and the intensities of the range gates before and after the peak intensity. In the case where a distance Ra of a range gate providing Pb is shorter than a distance Rb of a range gate providing Pa, the object detection unit 184 determines P1=Pb, R1=Rb, P2=Pa, and R2=Ra, while in the case where a distance Ra of a range gate providing Pb is longer than a distance Rb of a range gate providing Pa, the object detection unit 184 determines P1=Pa, R1=Ra, P2=Pb, and R2=Rb. The object detection unit 184, by using R1, R2, P1, and P2, calculates a detailed distance of the object.

Figure 11A:
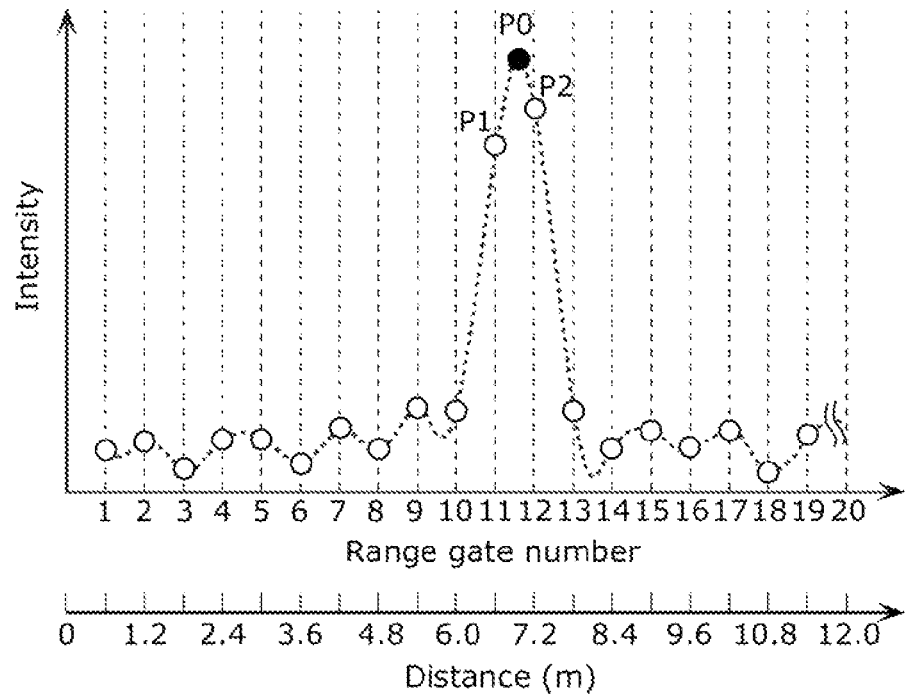
FIG. 11A is a diagram showing an output signal intensity of a specific Doppler frequency component of the Doppler frequency discrimination unit of the radar apparatus according to Embodiment 1 of the present invention.

FIG. 11A is a diagram showing a signal intensity with respect to a range gate in a specific Doppler frequency, and shows, as an example, a case where there is a single intensity peak. Moreover, a horizontal axis of FIG. 11A is a range gate number. Moreover, FIG. 11A also shows a distance from the radar apparatus corresponding to a case where a length of a range gate is 0.6 m.

The intensity variation, with respect to a round-trip propagation delay time (same as round-trip delay time) for the receiving antennas 106a and 106b to receive the transmission signal RF OUT modulated by the spreading code M1 after reflection on the target, is a correlation waveform which is generated when a delay time of the delay code M2 is converted into a bit time of a code as a unit. Accordingly, in the case where by setting a midpoint between R1 and R2 as a reference, an offset value of a target distance is considered, a ratio of P1 and P2 is calculated from an autocorrelation property as FIG. 11B. By using the relationship, the object detection unit 184 calculates, from the measured values of P1 and P2, an Roff distance offset value of a target, and calculates the detailed distance of the target as (RG1+RG2)/2+Roff. In other words, a distance from the radar apparatus with respect to a true peak intensity P0 in the intensity distribution shown in FIG. 11A can be calculated.

Figure 11B:
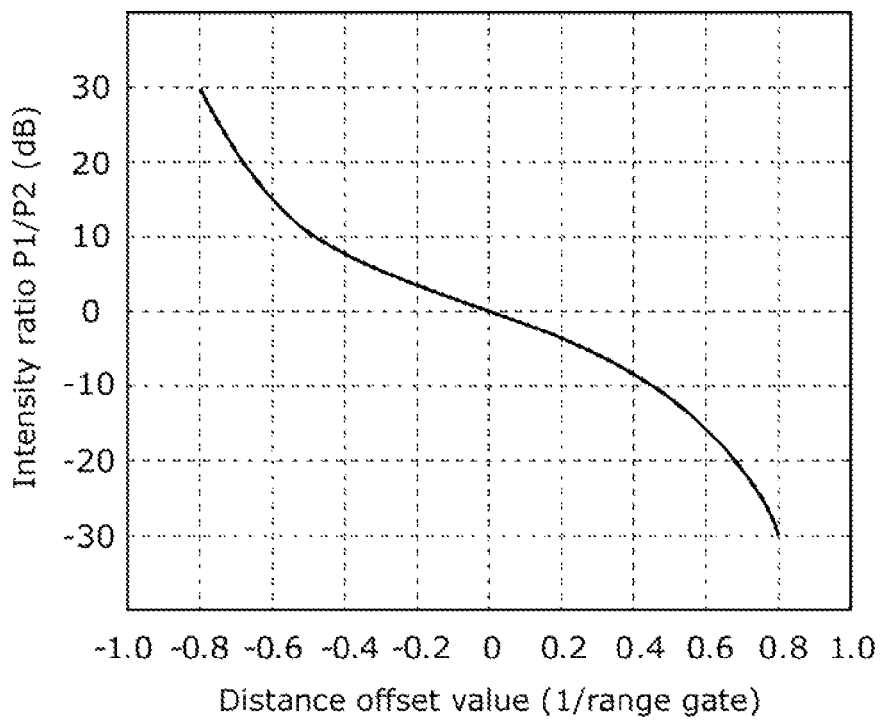
FIG. 11B is a diagram showing a relationship between a ratio of signal intensity of an adjacent range gate and a distance offset value according to Embodiment 1 of the present invention.

It is noted that, in practice, because there is a possibility that P1 and P2, in addition to the autocorrelation property of code, have an influence by which a transient response of a received signal by a range scan operation reaches an adjacent range gate, it is favorable that a curve shown in FIG. 11B be measured in advance by providing a reflector at the front of the radar apparatus.

It is noted that in the above description, an intensity for each of the range gates is used, but because each of the range gates corresponds to a delay time of the delay code M2 with respect to the spreading code M1 on a one-to-one basis, FIG. 11A has the same meaning as a signal intensity with respect to the delay time of the delay code M2 in a specific Doppler frequency. Moreover, a distance interval of a distance corresponding each of the adjacent range gate numbers corresponds to a bit time that is a time that provides one bit of the spreading code M1.

Accordingly, in the present modification, the object detection unit 184 calculates, for each Doppler frequency detected by the Doppler frequency discrimination units 182a and 182b, an intensity distribution of the Doppler frequency component corresponding to the delay time of the delay code M2 with respect to the spreading code M1. Then, the object detection unit 184, from the distribution, specifies a peak intensity Pa in which an intensity becomes maximum, and performs interpolation processing by using (i) the identified peak intensity Pa, (ii) a pre-peak intensity which is an intensity with respect to a delay time shorter by a bit time than the delay time of the delay code M2 corresponding to the identified peak intensity Pa, and (iii) a great intensity Pb among a post-peak intensity which is an intensity with respect to a delay time delayed by a bit time compared with the delay time of the delay code with respect to the identified peak intensity Pa. With this, the object detection unit 184 can estimate a distance from the radar apparatus to the target with a distance smaller than a length of a range gate as a resolution corresponding to a bit time.

In this way, the object detection unit 184 can detect a direction of a target with a resolution smaller than a length of the range gate and with a high degree of accuracy.

It is noted that in this example, the detailed distance to the target is calculated by using the intensities at the two adjacent range gates, but it is possible to calculate the detailed distance by using intensities of more range gates. With this, it is possible to enhance accuracy of a distance in such a case as where there is an influence of a transient response beyond a region of a range gate adjacent to a range gate that provides a peak of intensity.

Moreover, in the above described configuration, in the case where a frequency of carrier waves is f0, a maximum radial velocity for a detected object is vmax, a detection resolution of the radial velocity is vres, it is favorable that the chip rate CR of the transmission code M1 and the delay code M2 satisfy Expression 3.

$$CR \leq 2 \times f0 \times vres/vmax \quad \text{(Expression 3)}$$

With this, it is possible to decrease an error in detecting a distance of a target with a resolution smaller than a length of a range gate.

This is because the Doppler frequency fd owned by reflected waves from an object moving at a radial velocity v with respect to a wavelength λ of carrier waves is provided by fd=2×v/λ. Accordingly, in order that a detection resolution vres of a radial velocity can be realized, fdres=2×vres/λ is necessary as a Doppler frequency resolution fdres. In order to be realized, in the Doppler frequency discrimination processing, Tfft=1/fdres=λ/(2×vres) is necessary as a duration time Tfft of an input signal waveform. During this time, the object having the radial velocity vmax moves in a radial direction by a distance L=Tfft×vmax=λ×vmax/(2×vres), that is, in a range gate direction. Meanwhile, a length RG of a range gate can be represented by RG=c/(2×CR) by using a light velocity c and a chip rate CR of the spreading code. However, when in the implementation of the Doppler frequency discrimination processing, the object moves by a distance more than double the length of the range gate in the range gate direction, an influence of a single object occurs in three or more range gates. With this, an error of a calculation result of a detailed distance described with reference to FIG. 11A and FIG. 11B become bigger, which is not favorable. Accordingly, satisfying a relationship L≤2×RG is desirable. When the above described relationship and a relationship of λ=c/f0 is used, Expression 3 can be derived.

Embodiment 2

Next, a radar apparatus according to Embodiment 2 will be described.

The radar apparatus according to the present embodiment is almost the same as the radar apparatus 100 according to Embodiment 1, but further includes a control unit configured to control (i) a first operation mode in which the delay code generation unit 103b repeats the scan processing M times and (ii) a second operation mode in which the delay code generation unit 103b repeatedly generates the same delay code, wherein the control unit is configured to determine, in the first operation mode, whether or not there is a Doppler frequency component having an intensity equal to or greater than a predetermined second threshold value, and switch to the second operation mode when it is determined that there is the Doppler frequency component having the intensity equal to or greater than the predetermined second threshold value, the intensity being detected by the Doppler frequency discrimination units 182a and 182b, and the delay code generation unit 103b is configured to repeatedly generate, in the second operation mode, the delay code M2 corresponding to a range gate in which the Doppler frequency component equal to or greater than the predetermined second threshold value is detected, the signal storage units 181a and 181b are configured to avoid storing a demodulated signal which is despread using the delay code corresponding to the range gate, and demodulated, and the Doppler frequency discrimination units 182a and 182b are configured to detect again, by (i) sampling, in a cycle shorter than the scan period, the demodulated signal avoided being stored by the signal storage units 181a and 181b and (ii) performing frequency analysis on the sampled demodulated signal, a phase and an intensity of the Doppler frequency component in a range gate in which the Doppler frequency component equal to or greater than the predetermined second threshold value is detected.

Figure 12:
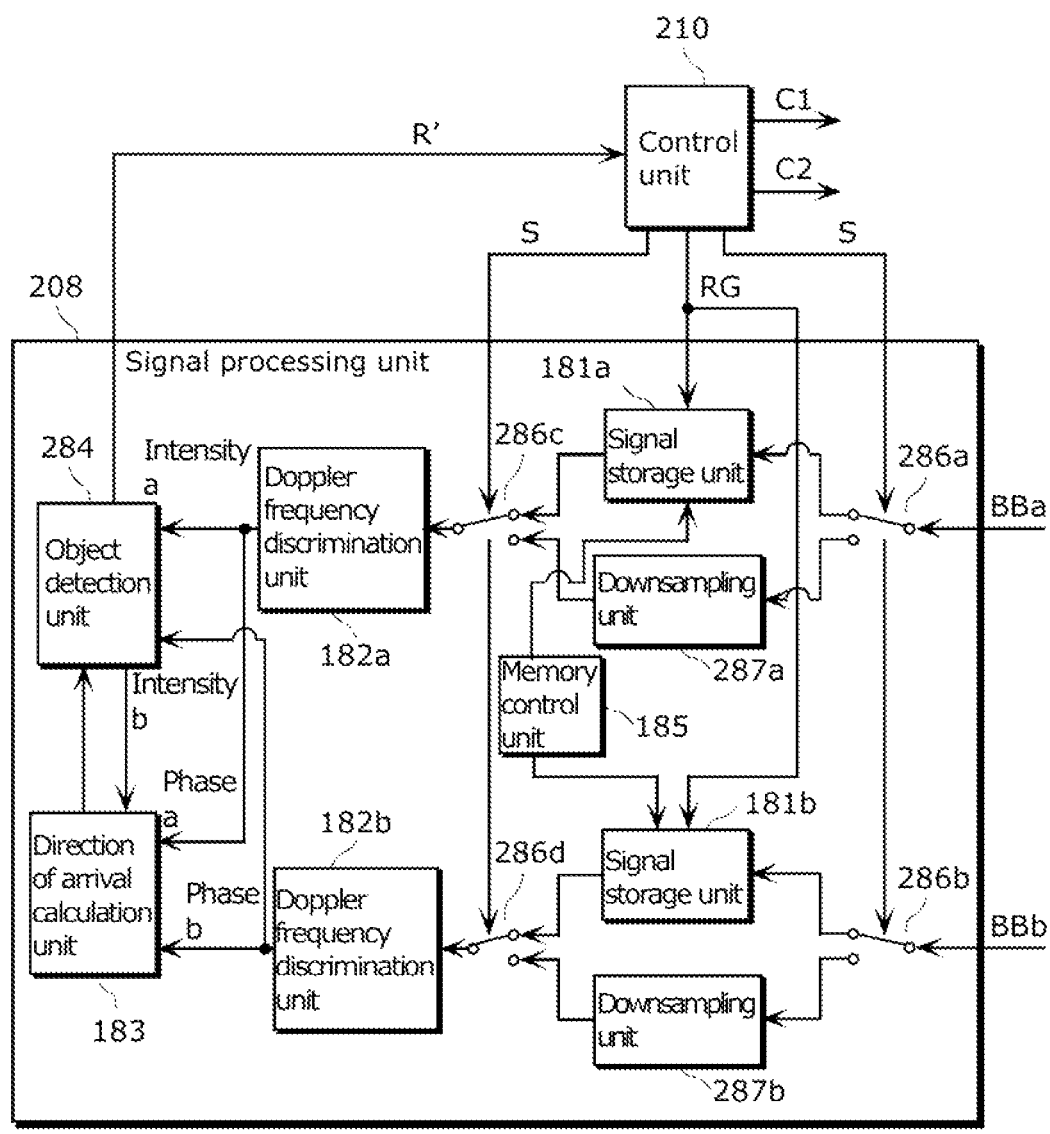
FIG. 12 is a diagram showing configurations of a control unit and a signal processing unit of a radar apparatus according to Embodiment 2 of the present invention.

FIG. 12 is block diagram showing configurations of a control unit and a signal processing unit according to Embodiment 2, and components of other non-illustrated components of the radar apparatus are the same as those of FIG. 1. As shown in FIG. 12, the radar apparatus according to Embodiment 2 uses a control unit 210 instead of the control unit 110 in FIG. 1, and a signal processing unit 208 instead of the signal processing unit 108 in FIG. 1. Moreover, in FIG. 12, the same signs as those in FIG. 1 are used for the same components as those in FIG. 1.

In the present embodiment, the signal processing unit 208, compared with the signal processing unit 108, further includes switches 286a, 286b, 286c, and 286d, and downsampling units 287a and 287b. Moreover, the signal processing unit 208 includes an object detection unit 284 instead of the object detection unit 184, and outputs an extracted range gate signal R' to the control unit 210.

The switch 286a selectively connects the receiving unit 107a with one of the signal storage unit 181a and the downsampling unit 287b. Likewise, the switch 286b selectively connects the receiving unit 107b with one of the signal storage unit 181b and the downsampling unit 287b. The switch 286c selectively connects one of the signal storage unit 181a and the downsampling unit 287a with the Doppler frequency discrimination unit 182a. Likewise, the switch 286d selectively connects one of the signal storage unit 181b and the downsampling unit 287b with the Doppler frequency discrimination unit 182b.

The switches 286a, 286b, 286c, and 286d switch, at the same timing, in accordance with a switch control signal S outputted from the control unit 210. For example, in the case where the switch 286a connects the receiving unit 107a with the signal storage unit 181a, that is in the case where a channel on FIG. 12 is on, the switch 286b connects the receiving unit 107a with the signal storage unit 181b, the switch 286c connects the signal storage unit 181a with the Doppler frequency discrimination unit 182a, and the switch 286d connects the signal storage unit 181b with the Doppler frequency discrimination unit 182b.

The downsampling units 287a and 287b are downsamplers of P:1 and each includes a low-pass filter which sets a frequency band at 1/P and a decimation processing unit which extracts a single sample for each of the P samples. With this processing, noise energy included in output signals of the downsampling units 287a and 287b decreases to 1/P of input signals. In other words, a signal-to-noise ratio enhances to a Pth time.

Specifically, at a time of the first operation mode, a complex baseband signal BB stored in the signal storage unit 181 is a signal which is transformed into a digital value by an A/D conversion at an input side of the complex baseband signal BB of the signal processing unit 208. A sampling frequency at the time of the A/D conversion is a first sampling frequency which is determined corresponding to a frequency which is a frequency of a sampling frequency of a Fast Fourier Transform multiplied by the number of range gates. Moreover, the sampling frequency of the Fast Fourier Transform is determined by a maximum value of the Doppler frequency analyzed by the Doppler frequency discrimination units 182a and 182b. Here, in the A/D conversion, an input signal having a frequency component higher than a Nyquist frequency defined as a frequency having half of the sampling frequency is folded back to equal to or less than the Nyquist frequency after the A/D conversion, and generates inseparable noise (called aliasing) by adding the input signal to a frequency component equal to or less than the Nyquist frequency included in the input signal of the A/D conversion. Accordingly, it is favorable that by installing a low-pass filter at the input unit of the A/D conversion, a frequency component equal to or greater than the Nyquist frequency be sufficiently suppressed. The low-pass filter is called an anti-aliasing filter. In this case, because in the first operation mode, it is necessary to perform sampling of a complex baseband signal BB corresponding to all the range gates within a single range scan period, the Nyquist frequency in the A/D conversion is set at a high value and a cutoff frequency of the anti-aliasing filter is also designed at a high value. In other words, the input signal of the A/D conversion is a wide band, and the first sampling frequency is designed at a high value.

However, when a frequency bandwidth of a signal is wider, noise of a digital signal after an A/D conversion is greater.

Therefore, in the second operation mode, the downsampling units 287a and 287b perform sampling of a baseband signal BB in a cycle shorter than a scan period of the first operation mode. Favorably, the downsampling units 287a and 287b perform sampling at the same cycle as that of the first sampling frequency in the first operation mode. With this, a common anti-aliasing filter can be used in the first operation mode and the second operation mode. Next, the downsampling units 287a and 287b, with respect to digital signals after the A/D conversion in the downsampling units 287a and 287b, limit a frequency bandwidth by the low-pass filter. The downsampling units 287a and 287b extract a single sample for each of the P samples obtained as the output signal. With this operation, the sampling frequency is converted into 1/P. Accordingly, a low-pass filter is designed each in the downsampling units 287a and 287b such that aliasing does not occur with respect to the sampling frequency that is converted. Specifically, the cutoff frequency of the low-pass filter is designed to have a frequency lower than the Nyquist frequency corresponding to a sampling rate after the downsampling. With this, noise can be decreased for a baseband signal which is downsampled by the downsampling units 287a and 287b.

Accordingly, accuracy of an intensity and a phase is enhanced for each of the Doppler frequencies discriminated by the Doppler frequency discrimination units 182a and 182b.

The difference of the control unit 210 from the control unit 110 according to Embodiment 1 is that an extracted range gate signal R' is further inputted from the signal processing unit 208 and a switch control signal S is outputted to the switches 286a, 286b, 286c, and 286d. The control unit 210, in addition to the function of the control unit 110, has further functions of controlling the first operation mode in which the delay code generation unit 103b repeats scan processing M times and the second operation mode in which the delay code generation unit 103b repeatedly generates the same delay code M2, and in the first operation mode, determining whether or not there is a Doppler frequency component in which an intensity detected by the Doppler frequency discrimination units 182a and 182b is equal to or greater than a predetermined threshold value, and switching to the second operation mode in the case where there is a Doppler frequency component equal to or greater than the predetermined threshold value.

It is noted that in the first operation mode, the radar apparatus according to the present invention operates in the same way as the radar apparatus 100 according to the Embodiment 1, and therefore their detailed descriptions will be omitted.

In the second operation mode, the control unit 210, by notifying the delay code generation unit 103b of a delay time corresponding to a range gate in which a Doppler frequency is detected whose intensity detected by the Doppler frequency discrimination units 182a and 182b is equal to or greater than a threshold value, repeatedly generates a delay code corresponding to the range gate. Moreover, in the second operation mode, the control unit 210, by a switch control signal S, connects the switches 286a and 286c with a side of the downsampling unit 287a, and connects the switches 286b and 286d to a side of the downsampling unit 287b. In other words, in the second operation mode, the signal storage units 181a and 181b do not store a complex baseband signal BB.

Accordingly, in the second operation mode, the Doppler frequency discrimination units 182a and 182b perform, in a cycle shorter than a scan period, sampling and perform frequency analysis on the baseband signal BB not stored in the signal storage units 181a and 181b. With this, the Doppler frequency discrimination units 182a and 182b detect, in a range gate in which a Doppler frequency component equal to or greater than a predetermined threshold value is detected, a phase and an intensity of the Doppler frequency component.

Next, operations of the radar apparatus configured above according to Embodiment 2 will be described.

Figure 13:
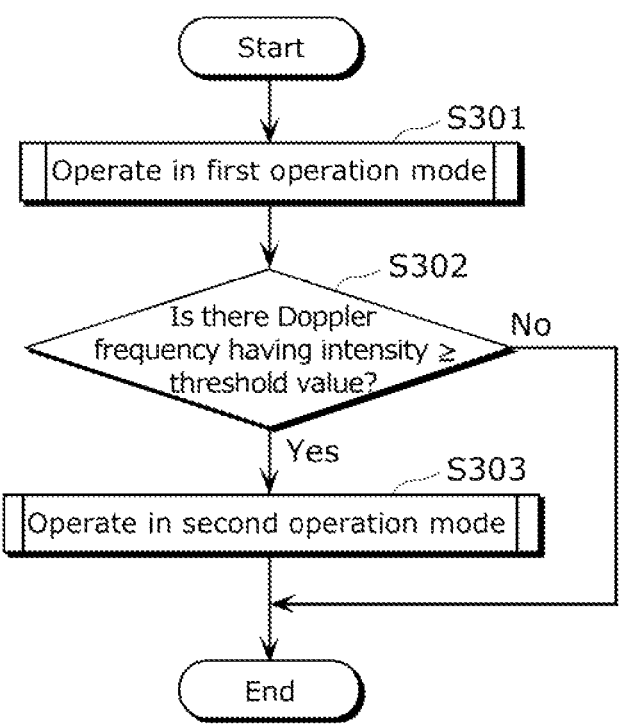
FIG. 13 is a flowchart showing operations of the radar apparatus according to Embodiment 2 of the present invention.

FIG. 13 is a flowchart showing the operations of the radar apparatus according to the present embodiment.

Figure 14:
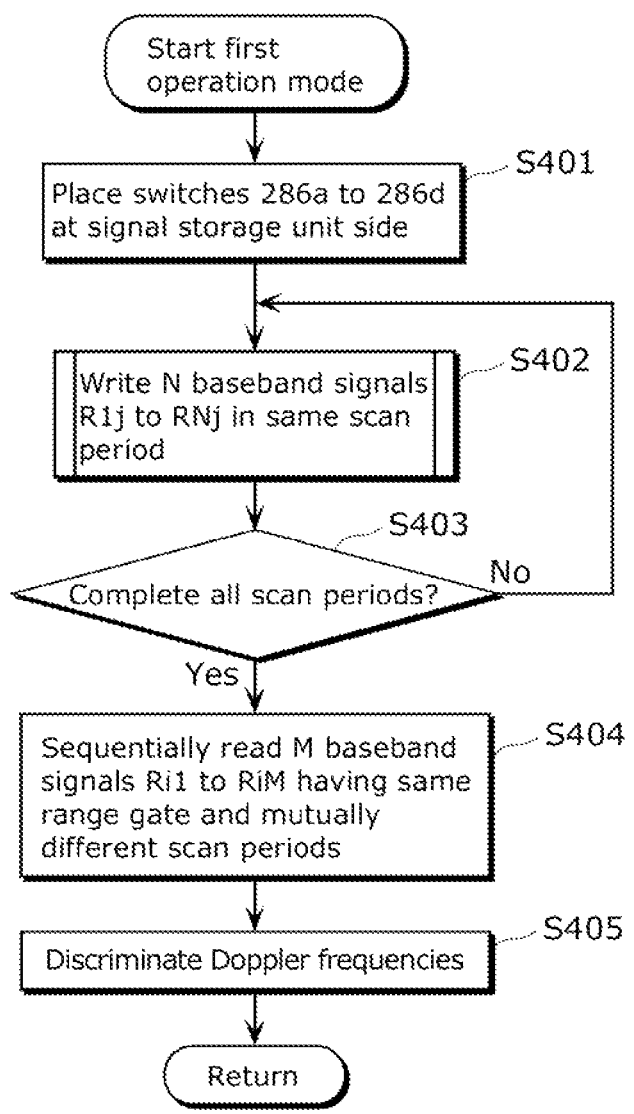
FIG. 14 is a flowchart showing specific operations of a first operation mode of the radar apparatus according to Embodiment 2 of the present invention.

First, the radar apparatus operates in the first operation mode (step S301). Specific operations of the first operation mode will be shown in FIG. 14.

First, the control unit 210 places the switches 286a, 286b, 286c, and 286d at sides of the signal storage units 181a and 181b (step S401).

Next, the memory control unit 185 stores, on the signal storage units 181a and 181b, received signals which are provided a range scan M times with respect to all N range gates covering a distance region of an observed object. In other words, the memory control unit 185 writes N baseband signals R1j to RNj in the same scan period in the signal storage units 181a and 181b (step S402). Later, the memory control unit 185 determines whether or not the write of a baseband signal on the signal storage units 181a and 181b is completed for the whole scan period (step S403). If not completed (No in step S403), the memory control unit 185 returns to the write processing of the baseband signal (step S402). Meanwhile, in the case where the write of the baseband signal is completed for the whole scan period (Yes in step S403), the memory control unit 185 sequentially reads out M baseband signals Ri1 to RiM having the same range gate and mutually different scan periods (step S404). The Doppler frequency discrimination unit 182a and the Doppler frequency discrimination unit 182b, for each of the range gates, perform frequency analysis on M baseband signals Ri1 to RiM read out from the signal storage units 181a and 181b by the memory control unit 185. In other words, the Doppler frequency discrimination unit 182a and the Doppler frequency discrimination unit 182b discriminate Doppler frequencies (step S405).

It is noted that steps S402 to S405 are the same as steps S101 to S104, respectively, and therefore detailed descriptions will be omitted.

Next, the object detection unit 284 specifies a range gate where there is a target. In other words, the object detection unit 284 determines whether or not there is a Doppler frequency in which intensity equal to or greater than a predetermined threshold value is detected (step S302). It is noted that in the processing performed so far, the radar apparatus also calculates a direction of a target by performing the same processing as that of Embodiment 1.

In the case where it is determined that there is a Doppler frequency in which an intensity equal to or greater than a threshold value is detected by the object detection unit 284 (Yes in step S302), the radar apparatus operates in the second operation mode (step S303). Meanwhile, in the case where it is determined that there is no Doppler frequency in which an intensity equal to or greater than a predetermined threshold value is detected (No in step S302), the radar apparatus ends the processing.

Figure 15:
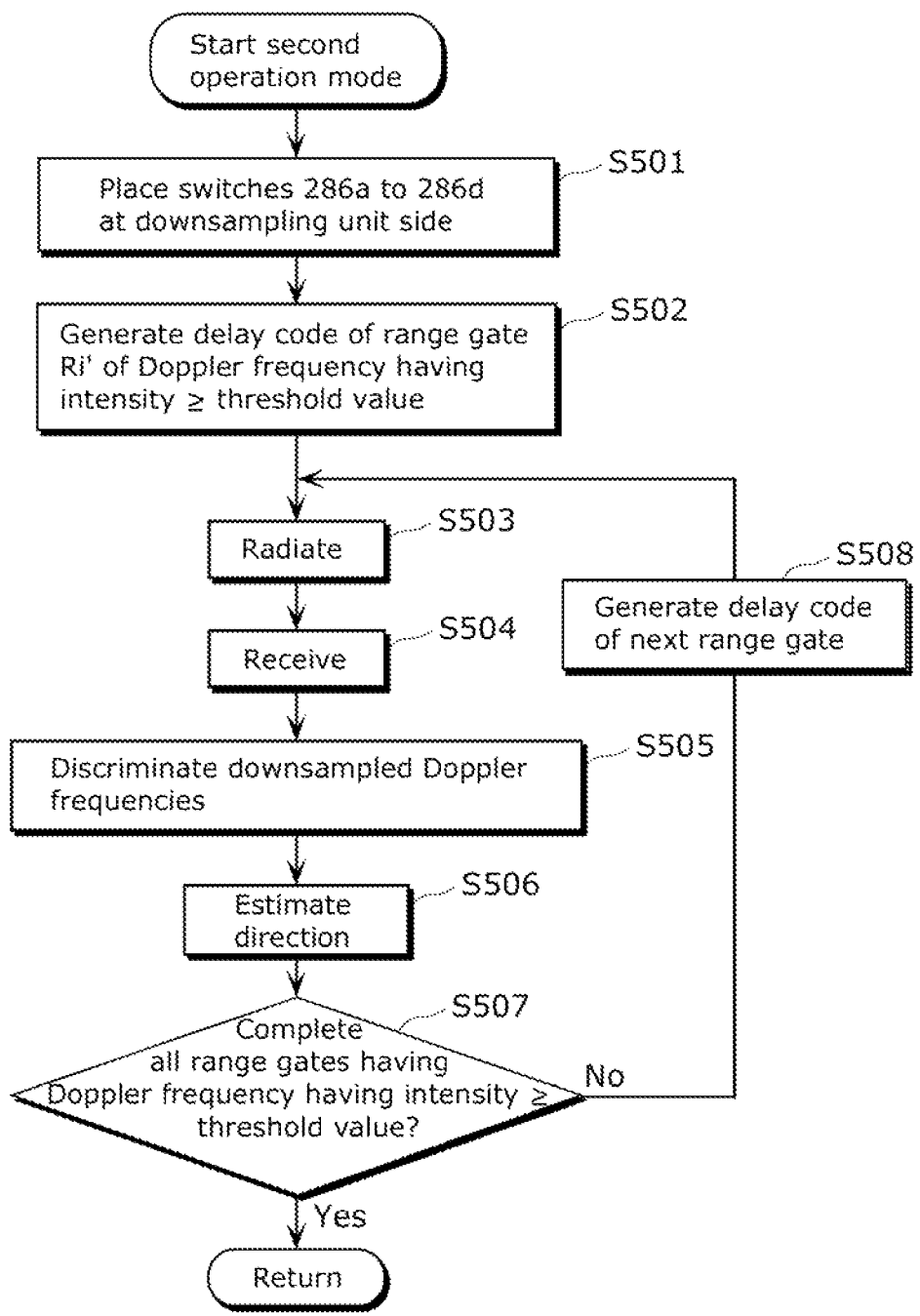
FIG. 15 is a flowchart showing specific operations of a second operation mode of the radar apparatus according to Embodiment 2 of the present invention.
Figure 16:
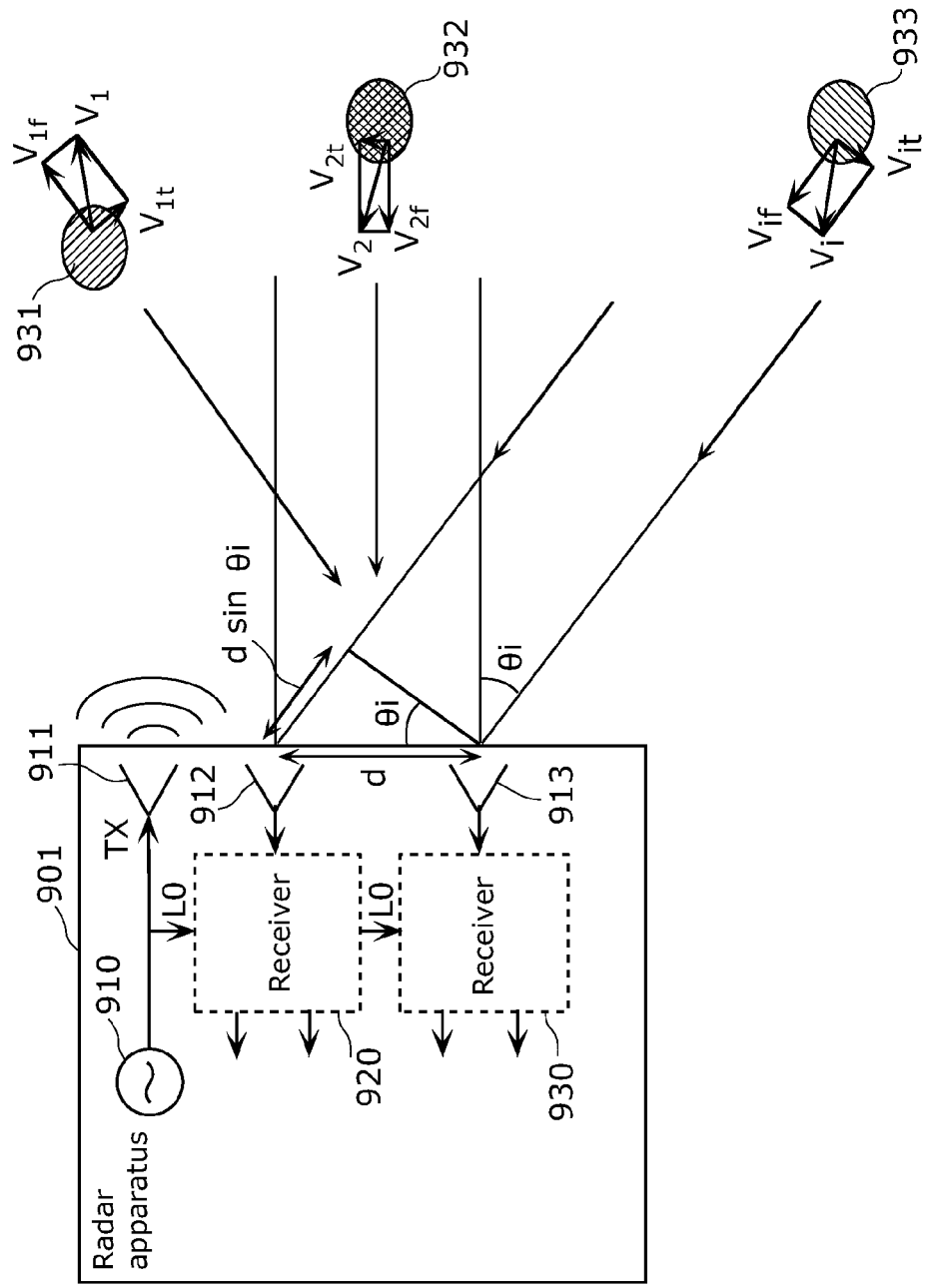
FIG. 16 is a block diagram showing a configuration of a conventional radar apparatus.

FIG. 15 is a flowchart showing detailed operations of the second operation mode (step S303).

First, the control unit 210 places the switches 286a, 286b, 286c, and 286d at sides of the downsampling units 287a and 287b (step S501).

Next, assuming that a range gate is Ri' in which a Doppler frequency component having an intensity equal to or greater than a predetermined threshold value is detected in step S302, the control unit 210 generates a delay code M2 corresponding to the range gate Ri' (step S502).

Then, the transmission antenna 105 radiates the transmission signal RF OUT generated by the transmission unit 104 as radiation waves rad_w (step S503). Then the reflected waves ref_w reflected by the target 200 are received by the receiving antennas 106a and 106b (step S504), the received reflected waves ref_w are despread and performed quadrature demodulation by the receiving units 107a and 107b, and then outputted as a baseband signal to the signal processing unit 208.

In the second operation mode, because the switches 286a, 286b, 286c, and 286d are placed at sides of the downsampling units 287a and 287b, a baseband signal inputted into the signal processing unit 208 is inputted into the downsampling units 287a and 287b. The baseband signal inputted into the downsampling units 287a and 287b, after being downsampled, is outputted to the Doppler frequency discrimination units 182a and 182b. In other words, in the second operation mode, the Doppler frequency discrimination unit 182a and the Doppler frequency discrimination unit 182b discriminate Doppler frequencies of baseband signals that are downsampled (step S505).

Then, the direction of arrival calculation unit 183 estimates a direction of arrival of the reflected waves ref_w (step S506).

The control unit 210 determines whether or nor estimation is completed for a direction of arrival of all the range gates in which a Doppler frequency component having an intensity equal to or greater than a predetermined threshold value is detected in step S302 (step S507), and in the case where the estimation is completed (Yes in step S507), the control unit 210 ends operation of the second operation mode.

Meanwhile, in the case where an estimation is not completed (No in step S507), the control unit 210, among range gates Ri' in which a Doppler frequency component having an intensity equal to or greater than a predetermined threshold value is detected, generates a delay code M2 corresponding to the next range gate (step S508) and repeats the above mentioned radiation step and the subsequent steps (step S503).

In other words, in the second operation mode, the control unit 210 fixes a range gate to each of the range gates Ri' in which a Doppler frequency component having an intensity equal to or greater than a predetermined threshold value is detected. Moreover, the control unit 210 provides output signals of the downsampling units 287a and 287b to each of the Doppler frequency discrimination units 182a and 182b. The Doppler frequency discrimination units 182a and 182b implement Doppler frequency discrimination processing and output a signal intensity to the object detection unit 284 and a phase to the direction of arrival calculation unit 183. The object detection unit 284 updates, in accordance with the output signal of the direction of arrival calculation unit 183, information about the direction of arrival corresponding to a range gate that is currently set.

Here, because a calculation result of the direction of arrival calculation unit 183 is generated after a decrease in noise energy by the downsampling units 287a and 287b, the calculation result has a high degree of accuracy and few errors. Accordingly, the radar apparatus can estimate a direction of arrival for an extracted target with a high degree of accuracy.

Moreover, an extracted point of a range gate may include a range gate which provides a peak value of the correlation waveform described in Embodiment 1 and a range gate which is adjacent to the peak. With this, it is possible to calculate a detailed distance of a target by the procedure described in the modification of Embodiment 1. Furthermore, because noise is decreased by the effects of the downsampling units 287a and 287b, a result with a higher degree of accuracy can be obtained.

Moreover, the above described processing is ended for all range gates Ri' in each of which a Doppler frequency component having an intensity equal to or greater than a predetermined threshold value is detected, the radar apparatus returns to the first step and repeats the above described processing.

It is favorable that the number of range gates Ri' in each of which a Doppler frequency component having an intensity equal to or greater than a predetermined threshold is detected be two or more items less than the total number N of range gates. In other words, it is favorable that a predetermined threshold value in step S302 be a value whose number of range gates Ri' determined to have an intensity equal to or greater than the threshold value is N−2 or less. Specifically, in the case where a radar has an object to prevent collision, it is favorable that based on a distance of the target and a radial velocity, a target be extracted in a decreasing order from a target having the highest probability of collision. Moreover, in the case where an aim is to thoroughly observe a target at a great distance, the faraway interested target may be first extracted.

With this, a time to implement Doppler frequency discrimination processing for all the range gates via the signal storage units 181a and 181b is equal to a time for performing Doppler frequency discrimination processing for any one of all the range gates via the downsampling units 287a and 287b. Accordingly, compared with the case where processing is always performed for all N range gates via the downsampling units 287a and 287b according to the procedure, an overall processing time of the radar apparatus can be decreased.

Moreover, in the second operation mode, a baseband signal observation time necessary for the Doppler frequency discrimination units 182a and 182b to perform frequency analysis may be equal to a time necessary to repeat a scan period M times.

With this, it is possible to decrease degradation in a velocity resolution because a velocity resolution in determining the existence of a target in all range gates can be equal to velocity resolution in detecting a direction and a distance with a high degree of accuracy of a target in a range gate which a Doppler frequency component equal to or greater than a predetermined threshold value is detected.

As described above, the radar apparatus according to the present embodiment is almost the same as the radar apparatus 100 according to Embodiment 1, but includes the control unit 210 configured to control (i) a first operation mode in which the delay code generation unit 103b repeats the scan processing M times and (ii) a second operation mode in which the delay code generation unit 103b repeatedly generates the same delay code M2, wherein the control unit 210 is configured to determine, in the first operation mode, whether or not there is a Doppler frequency component having an intensity equal to or greater than a predetermined threshold value, and switch to the second operation mode when it is determined that there is the Doppler frequency component having the intensity equal to or greater than the predetermined threshold value, the intensity being detected by the Doppler frequency discrimination units 182a and 182b, and the delay code generation unit 103b is configured to repeatedly generate, in the second operation mode, the delay code M2 corresponding to a range gate Ri' in which the Doppler frequency component equal to or greater than the predetermined threshold value is detected, the signal storage units 181a and 181b are configured to avoid storing a demodulated signal which is despread using the delay code corresponding to the range gate Ri', and demodulated, and the Doppler frequency discrimination units 182a and 182b are configured to detect again, by (i) sampling, in a cycle shorter than the scan period, the demodulated signal avoided being stored by the signal storage units 181a and 181b and (ii) performing frequency analysis on the sampled demodulated signal, a phase and an intensity of the Doppler frequency component in the range gate Ri' in which the Doppler frequency component equal to or greater than the predetermined threshold value is detected.

With this, the radar apparatus according to the present embodiment, compared with the radar apparatus according to Embodiment 1, can measure a distance and a direction of a target with a higher degree of accuracy.

Description is made for the radar apparatus according to the present embodiments, but the present invention is not limited to the embodiments.

For example, the present invention may be implemented as not only the above described radar apparatus but also a method of processing a baseband signal (also called demodulated signal) of the radar apparatus. Moreover, the present invention may be implemented as a program for causing a signal processing processor of a radar apparatus to execute the method.

Moreover, at least a part of the above described radar apparatus, specifically, may be constituted as a computer system including a microprocessor, Read Only Memory (ROM), Random Access Memory (RAM), a hard disk drive, a display unit, a keyboard, a mouse, and the like. A computer program is recorded on RAM or a hard disk drive. By operating a microprocessor according to a computer program, each of the devices achieves the function. The computer program in this case is structured by a plurality of instruction codes indicating commands to the computer to achieve the predetermined functions.

Furthermore, the present invention may be a computer-readable non-volatile storage medium which the above described computer program is recorded on, for example, a flexible disk, a hard disk, a CD-ROM, a magneto-optical disc (MO), a Digital Versatile Disc (DVD), a DVD-ROM, a DVD-RAM, a BD (Blu-ray Disc (registered trademark)), a semiconductor memory, and the like. Moreover, the above mentioned digital signals recorded on these non-volatile storage media are acceptable.

Moreover, the present invention may be something to transmit the above mentioned computer program or digital signals via an electrical communication line, a wireless or wired communication line, a network represented by the Internet, data broadcast, and the like Moreover, in the above description, an M-sequence code is used as the spreading code M1 and the delay code M2, but as the spreading code M1 and the delay code M2, a Gold code which is a combination of M-sequence codes may be used.

Moreover, the radar apparatus according to each of the embodiments may be applicable to a radar imaging apparatus by installing a function of estimating a shape of a target.

Moreover, in the above description, the radar apparatus is stationary, but may be moving.

Moreover, the radar apparatus may further estimate a radial velocity of a target. Specifically, the direction of arrival calculation unit 183 may further estimate, from a Doppler frequency component having an intensity equal to or greater than a predetermined threshold value detected by the Doppler frequency discrimination unit, a radial velocity which is a velocity of the target as viewed from the radar apparatus. With this, the radar apparatus can estimate a radial velocity of a target, making it possible to make a high level of determination such as prediction of an approach of a target.

Moreover, in above Embodiment 1, the radar apparatus 100 estimates, as a distance from the radar apparatus 100 to the target 200, a distance from the radar apparatus 100 of a range gate in which a Doppler frequency component having an intensity equal to or greater than a predetermined threshold value is detected by the Doppler frequency discrimination units 182a and 182b. The threshold value may be a constant value regardless of a distance from the radar apparatus 100, and considering that an intensity of a reflection signal is smaller due to propagation loss according to a distance from the radar apparatus 100, and may be, as a threshold intensity value evaluated by a unit of electric power, a value which becomes small by a fourth power of a distance. In other words, the threshold value is a constant value regardless of a range gate and a value which becomes small by the fourth power of a distance corresponding to the range gate.

Moreover, in above Embodiment 2, the radar apparatus switches to the second operation mode when it is determined that there is a Doppler frequency component equal to or greater than a threshold value in the first operation mode. The threshold value may be also, likewise the threshold value in above Embodiment 1, a constant value regardless of a range gate and a value which becomes small by the fourth power of a distance from the radar apparatus.

Moreover, the radar apparatus may lengthen a range gate of a spreading code as a radial velocity of the target 200 detected by the object detection unit 184 becomes greater. In other words, the radar apparatus may decrease a chip rate of the spreading code M1 as the radial velocity of the target 200 becomes greater. With this, it is possible, without degrading distance measurement accuracy, to detect a radial velocity and a direction of the target 200 at the object detection unit 184 and the direction of arrival calculation unit 183.

Moreover, the transmission unit 104, and the receiving units 107a and 107b are included in a configuration in which carrier waves LO from the oscillator 101 are distributed by the distributors 102a and 102b, and the receiving units 107a and 107b are implemented by a direction conversion method of performing quadrature demodulation by the same frequency f0 as that of carrier waves LO, but the present invention is not limited to these configurations. As long as a means for converting into a baseband signal is provided, other configurations are acceptable which can be conceived by those skilled in the art, and in this case also, an effect of the present invention can be achieved. For example, as a method of separating a range gate, a code modulation signal can be used. Moreover, in the receiving units 107a and 107b, despread using a delay code, a super-heterodyne method, or a low-IF method can be used together. Moreover, it goes without saying that among a plurality of antennas, there is a need of a phase-locked coherent reception in the concept of the present invention which estimates a direction of a target by using a phase difference among the antennas.

Moreover, in the above embodiments, each of M delay codes M2 generated by the delay code generation unit 103b is a code which is moved by a bit with respect to the transmission code M1, but the delay code M2 is not limited to this. For example, the delay code M2 may be a code which is moved at random by the integer multiple of one bit with respect to the transmission code M1.

Moreover, the above radar apparatus can be implemented as a radar apparatus for an automobile to be installed on an automobile.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The radar apparatus according to the present invention can be applicable to a hazard avoidance apparatus to be installed a variety of devices such as an automobile, a ship, and an airplane, and a robot, and to a suspicious individual detection apparatus in a security system.

The invention claimed is:
1. A radar imaging apparatus, comprising:
a transmission unit configured to generate a transmission signal by spreading carrier waves using a transmission spreading code;
a transmission antenna which radiates the transmission signal as radiation waves;
a plurality of receiving antennas each of which receives reflected waves which are the radiation waves reflected from an object;
a delay code generation unit configured to repeat, for M scan periods, scan processing of sequentially generating N delay codes in a scan period for scanning N range gates having mutually different distances from the radar imaging apparatus, the N delay codes being the same as the transmission spreading code and corresponding to the distances, M being an integer equal to or greater than two, and N being an integer equal to or greater than two;
a plurality of despreading units corresponding to the respective receiving antennas and each configured to despread, by sequentially using the N delay codes, the reflected waves received by a corresponding one of the receiving antennas;
a plurality of demodulators corresponding to said respective despreading units and each configured to perform, using the carrier waves, quadrature demodulation of the reflected waves despread by a corresponding one of said despreading units, and generate demodulated signals Rij corresponding to the reflected waves received by a corresponding one of said receiving antennas, i being an integer from one to N, and j being an integer from one to M;
a storage unit configured to store, in association with a delay time in said delay code generation unit and a scan period, the demodulated signals Rij generated by each of said demodulators;
a memory control unit configured to (i) repeatedly write, in said storage unit, for the M scan periods, the N demodulated signals R1j to RNj corresponding to the mutually different distances corresponding to the N delay codes in said delay code generation unit and a single scan period, and (ii) sequentially read out, from said storage unit, a group of the M demodulated signals Ri1 to RiM corresponding to same distances and mutually different scan periods;
a Doppler frequency detection unit configured to detect, for each of said demodulators, a Doppler frequency component, a phase, and an intensity by performing frequency analysis on the M demodulated signals Ri1 to RiM read out by said memory control unit and corresponding to the same distances, the Doppler frequency component being a frequency component representing a difference between the reflected waves and the carrier waves in each of the range gates, and the phase and the intensity corresponding to the Doppler frequency component; and
a direction estimation unit configured to estimate a direction of the object by (i) calculating, from the detected phase corresponding to each of said demodulators, a phase difference between said demodulators and (ii) detecting, from the calculated phase difference, a direction of arrival of the reflected waves in each of the range gates.

2. The radar imaging apparatus according to claim 1, wherein said direction estimation unit is configured to estimate that a direction of arrival of the reflected waves including a Doppler frequency component is the direction of the object, the Doppler frequency component having an intensity equal to or greater than a predetermined first threshold value, and the intensity being detected by said Doppler frequency detection unit.

3. The radar imaging apparatus according to claim 2, further comprising
a distance estimation unit configured to estimate that the distance of one of the range gates in which the Doppler frequency component is detected is a distance from said radar imaging apparatus to the object, the Doppler frequency component having an intensity equal to or greater than the first threshold value, and the intensity being detected by said Doppler frequency detection unit.

4. The radar imaging apparatus according to claim 2, wherein said direction estimation unit is further configured to estimate, from the Doppler frequency component, a radial velocity which is a velocity of the object as viewed from said radar imaging apparatus, the Doppler frequency component having the intensity equal to or greater than the first threshold value, and the intensity being detected by said Doppler frequency detection unit.

5. The radar imaging apparatus according to claim 1,
wherein each of the N delay codes has a delay time which is mutually different with respect to the transmission spreading code, and
the delay time is an integer multiple of a bit time which is a time for providing one bit of the transmission spreading code.

6. The radar imaging apparatus according to claim 5,
wherein said distance estimation unit is configured to:
identify a peak intensity from an intensity distribution of the Doppler frequency component corresponding to the delay time for each Doppler frequency component, the peak intensity being a local maximum intensity, and the Doppler frequency component being detected by said Doppler frequency detection unit; and
estimate a distance from said radar imaging apparatus to the object by performing interpolation processing with use of the identified peak intensity, a pre-peak intensity, and a post-peak intensity, the distance being estimated with, as a resolution, a distance shorter than a distance corresponding to the bit time, the pre-peak intensity being an intensity corresponding to a delay time shorter by the bit time than the delay time corresponding to the identified peak intensity, and the post-peak intensity being an intensity corresponding to a delay time longer by the bit time than the delay time corresponding to the identified peak intensity.

7. The radar imaging apparatus according to claim 1,
wherein, a chip rate CR of the transmission spreading code and the delay code satisfies:
CR≤2×f0×vres/vmax where a frequency of the carrier waves is f0, an estimated maximum value of a radial velocity which is a velocity of the object as viewed from said radar imaging apparatus is vmax, and a resolution at which the radial velocity can be detect is vres.

8. The radar imaging apparatus according to claim 1, further comprising
a control unit configured to control (i) a first operation mode in which said delay code generation unit repeats the scan processing M times and (ii) a second operation mode in which said delay code generation unit repeatedly generates the same delay code,
wherein said control unit is configured to determine, in the first operation mode, whether or not there is a Doppler frequency component having an intensity equal to or greater than a predetermined second threshold value, and switch to the second operation mode when it is determined that there is the Doppler frequency component having the intensity equal to or greater than the predetermined second threshold value, the intensity being detected by said Doppler frequency detection unit, and
said delay code generation unit is configured to repeatedly generate, in the second operation mode, the delay code corresponding to a range gate in which the Doppler frequency component equal to or greater than the predetermined second threshold value is detected,
said storage unit is configured to avoid storing a demodulated signal which is despread using the delay code corresponding to the range gate, and demodulated, and
said Doppler frequency detection unit is configured to detect again, by (i) sampling, in a cycle shorter than the scan period, the demodulated signal avoided being stored by said storage unit and (ii) performing frequency analysis on the sampled demodulated signal, a phase and an intensity of the Doppler frequency component in a range gate in which the Doppler frequency component equal to or greater than the predetermined second threshold value is detected.

9. The radar imaging apparatus according to claim 8,
wherein, in the second operation mode, an observation time of the demodulated signal necessary for said Doppler frequency detection unit to perform the frequency analysis is equal to a time necessary to repeat the scan period M times.

10. The radar imaging apparatus according to claim 8,
wherein the predetermined second threshold value is a value in which the number of the range gates is N−2 or less, each of the range gates being determined to have the intensity equal to or greater than the predetermined second threshold value.

* * * * *